United States Patent
Okita et al.

(10) Patent No.: US 6,342,665 B1
(45) Date of Patent: Jan. 29, 2002

(54) MUSIC GAME SYSTEM, STAGING INSTRUCTIONS SYNCHRONIZING CONTROL METHOD FOR SAME, AND READABLE RECORDING MEDIUM RECORDED WITH STAGING INSTRUCTIONS SYNCHRONIZING CONTROL PROGRAM FOR SAME

(75) Inventors: Katsunori Okita, Kobe; Tadasu Kitae; Masato Nagatomi, both of Nishinomiya; Naonobu Kaneiso, Kobe; Toru Takeda, Osaka; Motoki Toyama, Kobe, all of (JP)

(73) Assignee: Konami Co., Ltd., Tokyo (JP)

(*) Notice: Subject to any disclaimer, the term of this patent is extended or adjusted under 35 U.S.C. 154(b) by 0 days.

(21) Appl. No.: 09/503,254

(22) Filed: Feb. 14, 2000

(30) Foreign Application Priority Data

Feb. 16, 1999 (JP) .......................... 11-037935

(51) Int. Cl.⁷ .................. G10H 7/00; G10H 1/36
(52) U.S. Cl. .................. 84/609; 84/600; 84/610; 84/634; 84/649; 84/650; 84/666
(58) Field of Search .................. 84/600–602, 609–912, 84/622–625, 634–636, 649–652, 659–660, 666–668

(56) References Cited

U.S. PATENT DOCUMENTS

| | | | |
|---|---|---|---|
| 4,572,509 A | | 2/1986 | Sitrick |
| 4,924,745 A | * | 5/1990 | Kimpara et al. ............... 84/609 |
| 4,958,835 A | * | 9/1990 | Tashiro et al. ................ 273/85 |
| 5,393,926 A | | 2/1995 | Johnson |
| 5,491,297 A | | 2/1996 | Johnson et al. |
| 5,592,609 A | | 1/1997 | Suzuki et al. |
| 5,637,822 A | | 6/1997 | Utsumi et al. |
| 5,670,729 A | | 9/1997 | Miller et al. |
| 5,680,533 A | | 10/1997 | Yamato et al. |
| 5,680,534 A | | 10/1997 | Yamoto et al. |
| 5,723,802 A | | 3/1998 | Johnson et al. |
| 5,726,372 A | * | 3/1998 | Eventoff et al. ............... 84/609 |
| 5,925,843 A | | 7/1999 | Miller et al. |
| 5,952,599 A | * | 9/1999 | Dolby et al. .................. 84/649 |
| 6,001,013 A | | 12/1999 | Ota |
| 6,005,180 A | | 12/1999 | Masuda |
| 6,031,174 A | * | 2/2000 | Takabayashi ................ 84/609 |

FOREIGN PATENT DOCUMENTS

| | | |
|---|---|---|
| JP | 7-80152 | 3/1995 |
| JP | 7-289736 | 11/1995 |
| JP | 8-305356 | 11/1996 |
| JP | 9-160546 | 6/1997 |
| JP | 10-49178 | 2/1998 |
| JP | 10-171741 | 6/1998 |
| JP | 11-239672 | 9/1999 |
| WO | WO9636034 | 11/1996 |

OTHER PUBLICATIONS

Metro/Life Graphic/Abecks.TT/ENIX 1998.

* cited by examiner

Primary Examiner—Marlon T. Fletcher
(74) Attorney, Agent, or Firm—Jordan and Hamburg LLP

(57) ABSTRACT

A drum rhythm game apparatus and a guitar rhythm game apparatus each includes a staging operating unit. Playing progression information, which includes sector numbers, is transferred between the drum rhythm game apparatus and the guitar rhythm game apparatus, thereby enabling staging operation to be implemented from each of the staging operating units while synchronizing the visual staging instructions provided to players of the game for the background music piece to be played at both the drum rhythm game apparatus and the guitar rhythm game apparatus. This allows the game to be played in a state closer to reality in which multiple players each have staging operating units as different instrument, such as with an actual band, making the game more enjoyable.

24 Claims, 29 Drawing Sheets

THIS GAME IS FOR SALE AND USE IN
JAPAN ONLY. THE COPYRIGHTED MUSIC /
CHARACTERS / ART WORK IN THIS GAME
ARE SEPARATELY OWNED BY THE AUTHORS.
THE PUBLIC PERFORMANCE OF THIS GAME
OUTSIDE THIS TERRITORY IS PROHIBITED
BY LAW AND VIOLATORS ARE SUBJECT TO
SEVERE PENALTIES UNLESS SPECIALLY
AUTHORIZED BY KONAMI.

©1999 KONAMI
ALL RIGHTS RESERVED.

98

| PLAYER 1 | RESULT | PLAYER 2 |
|---|---|---|
| 100% 1 2 3 | COOL | 1 2 3 100% |
| 100% 1 2 3 | GOOD | 1 2 3 100% |
| 100% 1 2 3 | MISS | 1 2 3 100% |
| 1 2 3 | MAX COMBO | 1 2 3 |
| 1 2 3 % | SECRET | 1 2 3 % |
| 01234567 | TOTAL SCORE | 01234567 |
| A | RANK | D |

PRESS START BUTTON
CREDITS 02

MUSIC GAME SYSTEM, STAGING INSTRUCTIONS SYNCHRONIZING CONTROL METHOD FOR SAME, AND READABLE RECORDING MEDIUM RECORDED WITH STAGING INSTRUCTIONS SYNCHRONIZING CONTROL PROGRAM FOR SAME

BACKGROUND OF THE INVENTION

1. Field of the Invention

The present invention relates to a music game system using music staging game apparatuses for performing staging as to music such as with a musical rhythm-matching game, a staging instructions synchronizing control method for this music game system, and a readable storage medium wherein a staging instructions synchronizing control program for this music game system is stored.

2. Description of the Related Art

Conventionally, there are game systems wherein sounds are matched in rhythm with background music (hereafter also referred to as "BGM"), or wherein a short playing of around one phrase or so is added and staged.

Also, guitar game apparatus which generates a cardiogram-like rhythm, which performs rhythm matching while watching a cardiogram-like rhythm, has been proposed (refer to Japanese Patent National Publication No. 8-5108449).

However, with rhythm-matching such as the above-described conventional guitar game apparatus, operation was performed to one instrument, but this was not a rhythm-matching game performed with multiple instruments of different types such as multiple string instruments like guitars and complex percussion instruments like drums, and was not performed in a state closer to reality where multiple players each have different instrument parts to play a game such as with an actual band.

SUMMARY OF THE INVENTION

The present invention has been made in order to solve the above conventional problems, and it is an object thereof to provide a music game system, music game method, and a readable storage medium thereof capable of realizing a game closer to reality wherein multiple players each have different instrument parts to play the game, as with an actual band.

To this end, the music game system according to the present invention comprises: a sound output unit for outputting the played sound of a music piece, based on playing information; a display unit for providing players with staging instructions, based on playing progression information synchronized with the playing information; a staging operating unit for players to perform operation regarding the staging instructions; and first and second music staging game apparatuses each having output units for outputting the contents of operation made to the staging operating unit; wherein the first and second music staging game apparatuses are connected by a communication unit for transferring at least the playing progression information; and wherein, regarding the communication unit, an information sending unit is provided to the side of the first music staging game apparatus, and an information receiving unit is provided to the side of the second music staging game apparatus.

The above configuration enables the first and second music staging game apparatuses to be synchronized while performing staging operation from the staging operation units of each, by means of sending playing progression information between the first and second music staging game apparatuses, so a game can be played in a state closer to reality by multiple players each having different instrument parts for example for each of the staging operating units, as with an actual band.

BRIEF DESCRIPTION OF THE DRAWINGS

FIGS. 3A and 3B are diagrams illustrating an example of a variation of the drum pad shown in FIG. 2, wherein FIG. 3A is a plan view thereof, and FIG. 3B is a cross-section view along IIIB—IIIB in FIG. 3A;

DETAILED DESCRIPTION OF THE PREFERRED EMBODIMENTS

The following is a description of an embodiment of the music game system according to the present invention, with reference to the drawings.

Figure 1:
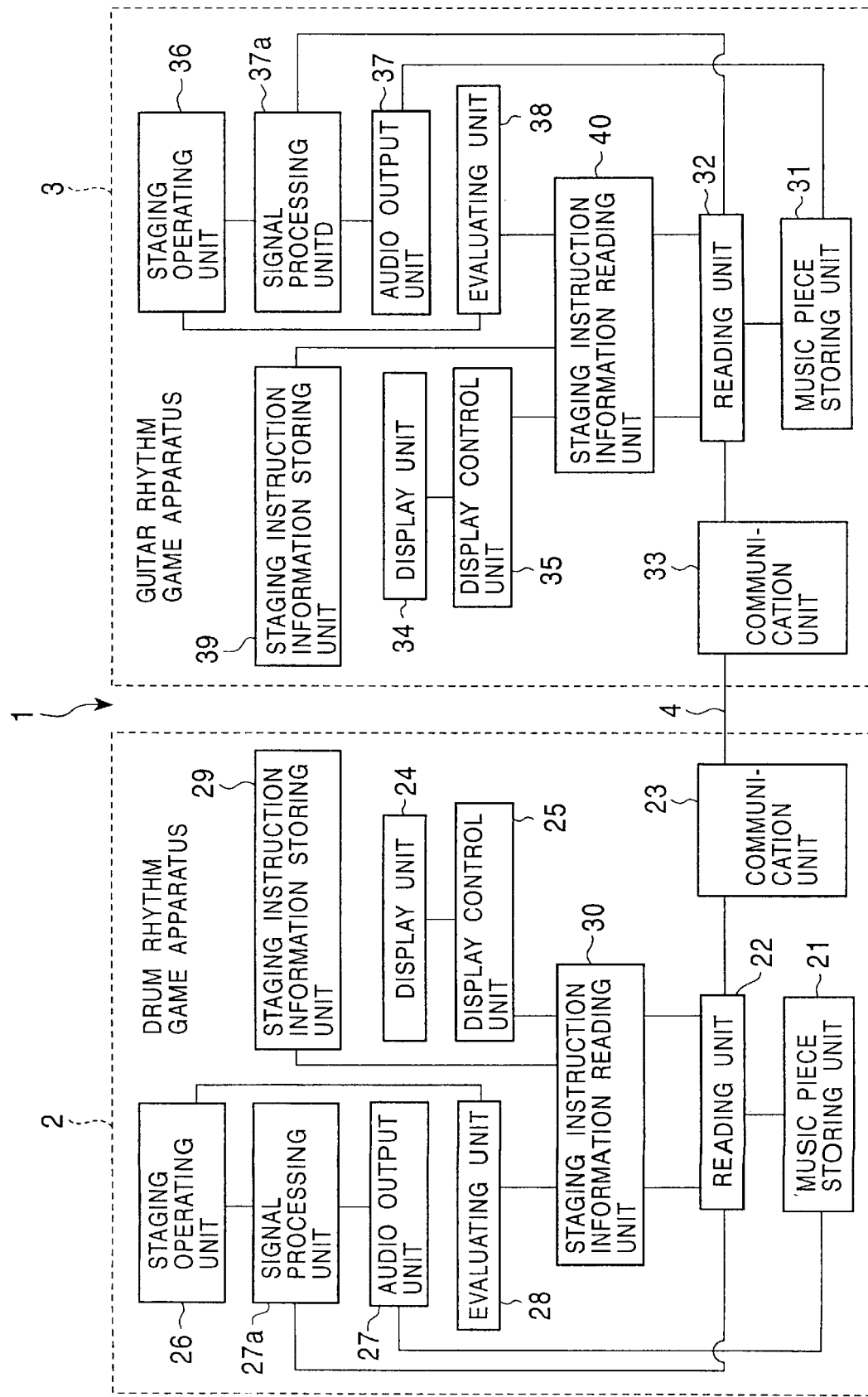
FIG. 1 is a block diagram illustrating the configuration of the rhythm game system according to an embodiment of the present invention.

FIG. 1 is a block diagram illustrating the configuration of the rhythm game system according to an embodiment of the present invention. In FIG. 1, the rhythm game system 1 serving as the music game system comprises: a drum rhythm game apparatus 2, a guitar rhythm game apparatus 3, and a transfer cable 4 serving as a transfer means mounted between the drum rhythm game apparatus 2 and the guitar rhythm game apparatus 3 for information communication, wherein the playing progression information such as latter-described sector Nos. is subjected to data communication between the drum rhythm game apparatus 2 and the guitar rhythm game apparatus 3 by using the sending/receiving means 92 and 111 described later with reference to FIG. 6 via the transfer cable 4, so as to synchronize visual staging instructions to the players for the BGM music piece being played for both the drum rhythm game apparatus 2 and the guitar rhythm game apparatus 3, while performing audio output of the different types of mimic musical instruments which are the drum rhythm of the drum rhythm game apparatus 2 and the guitar rhythm of the guitar rhythm game apparatus 3, thereby causing the rhythm-matching game to progress.

The drum rhythm game apparatus 2 comprises a music piece storing unit 21 which stores at least one music piece worth of BGM played music piece (playing information), a reading unit 22 which read sector Nos. (synchronizing information) from the music piece storing unit 21, a communicating unit 23 which sends the read sector Nos. to external parts via the transfer cable 4 and receives sector Nos. sent from external parts, a display unit 24 which performs image displays, a display control unit 25 for causing the display unit 24 to display images for providing the player with staging instructions based on sector Nos. synchronized with the BGM played music piece, a staging operating unit 26 mimicking multiple percussion instruments (drums, cymbals, etc.) for the player to operate in accordance with the staging instructions on the displayed screen on the display unit 24, a signal processing unit 27a for performing signal processing of the input operations from the staging operating unit 26 into audio output signals, an audio output unit 27 for performing audio output of the BGM played music piece from the music piece storing unit 21 and also performing audio output of sounds corresponding to the staging operations from the staging operation unit 26, an evaluating means 28 for comparing the input operation timing from the staging operation unit 26 with the later-described visual display made to the player (the later-described note display) and making an evaluation from the amount of offset, a staging instructions storing means 29 for readably storing staging instructions information for performing visual staging instructions to the player in correlation with sector Nos., and a staging instructions information reading unit 30 for reading the staging instructions information from the staging instructions information storing means 29, based on sector Nos.

In the same way, the guitar rhythm game apparatus 3 comprises a music piece storing unit 31 which stores at least one music piece worth of BGM played music piece (playing information), a reading unit 32 which reads sector Nos. (synchronizing information) from the music piece storing unit 31, a communicating unit 33 which sends the read sector Nos. to external parts via the transfer cable 4 and receives sector Nos. sent from external parts, a display unit 34 which performs image displays, a display control unit 35 for outputting to the display unit 34 and causing the display unit 34 to display images for providing the player with playing instructions (display guide) based on sector Nos. synchronized with the BGM played music piece, a staging operating unit 36 mimicking a guitar for the player to operate in accordance with the staging instructions on the displayed screen on the display unit 34, a signal processing unit 27a for performing signal processing of the input operations from the staging operating unit 36 into audio output signals, an audio output unit 37 for performing audio output of the BGM played music piece from the music piece storing unit 21 and also performing audio output of the staging operations from the staging operation unit 36, an evaluating means 38 for comparing the input operation timing from the staging operation unit 36 with the later-described visual staging display instructions made to the player and making an evaluation from the amount of offset, a staging instructions storing means 39 for readably storing staging instructions information for performing visual staging instructions to the player in correlation with sector Nos., and a staging instructions information reading unit 40 for reading the staging instructions information from the staging instructions information storing means 39, based on sector Nos.

Though not shown in the drawings, the drum rhythm game apparatus 2 and the guitar rhythm game apparatus 3 each have master-slave control means for detecting that a coin has been deposited first, such that the game apparatus side to which the coin was deposited first serves as the master side game apparatus, and the game apparatus side to which the coin was deposited later serves as the slave side game apparatus. At the master side game apparatus, this master-slave control means acts such that sector Nos. are sequentially read at the reading unit 22 or 32, and output control is performed to the communication unit 23 or 33 as sector Nos. sent ahead by a predetermined amount of time (the amount of delay in time owing to transmission and reception by the communication units 23 and 33, and so forth) as to the read sector Nos. Also, at the slave side game apparatus, this master-slave control means acts such that the display control unit 25 or 35 and the evaluation unit 28 or 38 are controlled based on the sector Nos. (synchronizing information) received by the communication unit 23 or 33 which are ahead by the amount of delay time. Incidentally, the sector Nos. are stored in the music piece storing units 21 and 31, synchronized with the BGM music piece to be played. The sector Nos. are the writing position information for optical disks such as CDs (or magnetic disks) for storing the BGM played music piece in predetermined time units.

On the other hand, the BGM played music piece is a music piece to be played by the drum game or guitar game for example, and audio output of the BGM played music piece is performed by the one of the drum rhythm game apparatus 2 and the guitar rhythm game apparatus 3 which is the master side game apparatus, and the drum rhythm is output from the audio output unit 27 side of the drum rhythm game apparatus 2 and the guitar rhythm is output from the audio output unit 37 side of the guitar rhythm game apparatus 3. Of course, the arrangement is such that drum rhythm game apparatus 2 and the guitar rhythm game apparatus 3 can each be used to enjoy rhythm-matching games individually, or the drum rhythm game apparatus 2 and the guitar rhythm game apparatus 3 can be synchronized via the transfer cable 4 to enjoy a rhythm-matching game together. In this case, the configuration is such that the combination mode (two-machine mode) is selected at the drum rhythm game apparatus 2 and the guitar rhythm game apparatus 3, and control is made so that the audio or the BGM played music piece is output from only the master side game apparatus to which a coin was deposited first.

Figure 2:
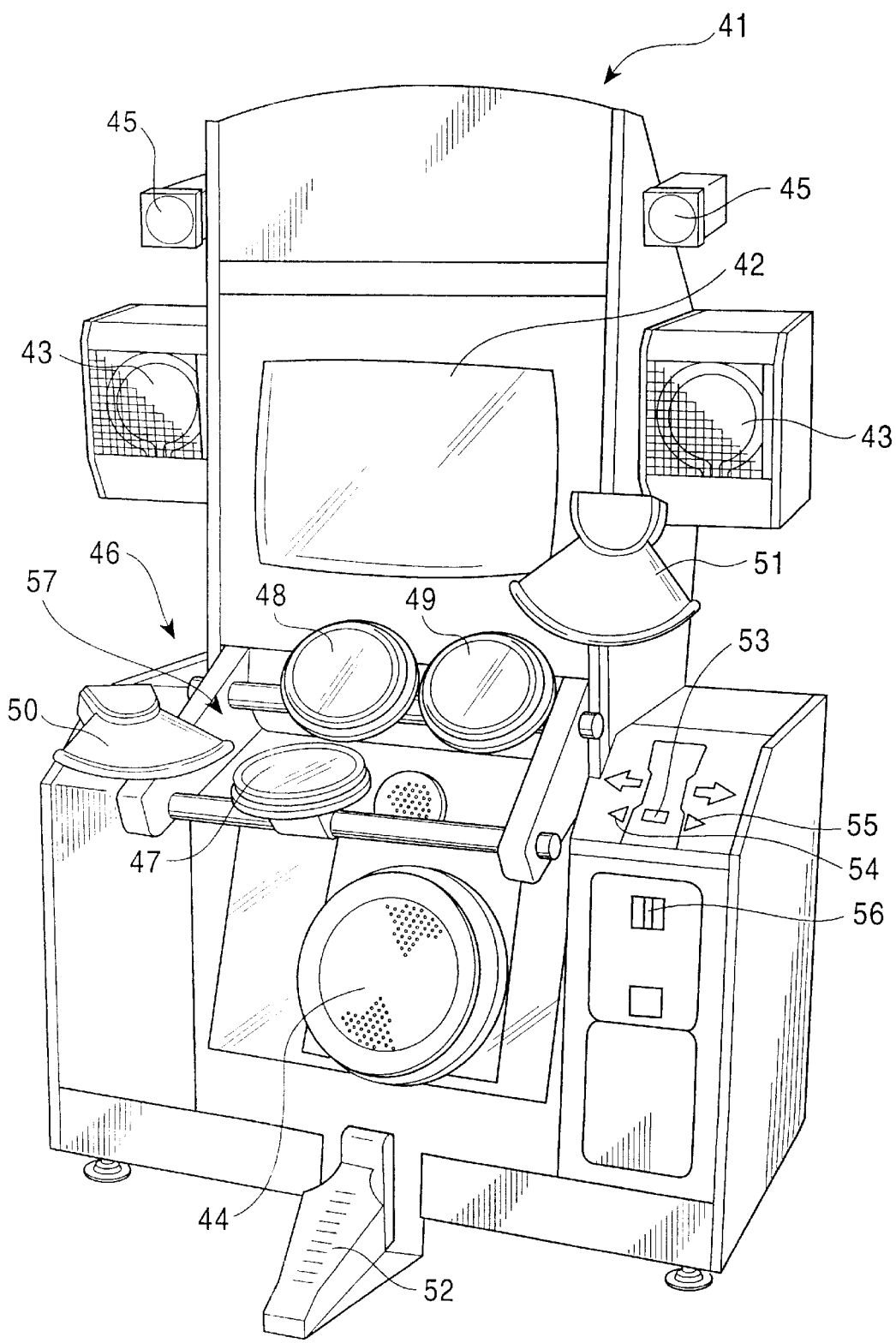
FIG. 2 is an external perspective view of the drum rhythm game apparatus shown in FIG. 1.

Now, a specific example of the drum rhythm game apparatus 2 will be described below in further detail. FIG. 2 is an external perspective diagram illustrating an example of the drum rhythm game apparatus 2 shown in FIG. 1. In FIG. 2, the rhythm game apparatus 41 is provided with a television monitor 42 (hereafter referred to as monitor 42) at the upper center portion of the front of the housing, for performing various types of image output relating to the rhythm game. Also, sound source full-range speakers 43 are provided to both the left and right sides of the monitor 42 for audio output of the instrument sound according to the striking input instructions of the player along with the background music, and a low-range woofer speaker 44 is provided at the center position of the lower part of the front of the housing. Further, halogen lamps 45 are positioned to the upper right and left positions on the housing of the monitor 42 in order to produce staging effects by blinking and so forth with regard to the played music piece.

Also, the area below the monitor 42 is inclined so that the front of the housing is tilted with the forward direction being lower, thereby forming an array area 46 for multiple mimic percussion instruments, where drum pads 47, 48, and 49 mimicking percussion instruments each having different tones are positioned in an L-formation (these are in an L-formation with the present embodiment, and the drum pads 47, 48, and 49 can be moved to the left or right) from the inclined front portion toward the deeper center portion, and further to the left of the drum pad 47 and to the upper side of the drum pad 49 at the deeper right side are arrayed drum pads 50 and 51 mimicking percussion instruments with differing tones such as cymbals. Further, a foot pedal 52 serving as rhythm input detecting means for a mimic percussion instrument such as a bass drum or the like is provided at the center near side of the lowest portion of the front of the housing.

Further, provided to the right side of the array area 46 for the mimic percussion instruments of the drum rhythm game apparatus 41 is a confirm/start button 53, and selection buttons 54 and 55 on either side thereof, with a coin deposit opening 56 being provided below the position at which these buttons are arrayed.

The internal structure of these drum pads 47 through 51 will be described. The drum pads 47 through 49 have a circular external plan-view form, but such with generally half-circle shapes for the external plan-view form such as shown in FIG. 3A may be employed in the same manner, and the internal structure in this case will be described.

Figure 3B:
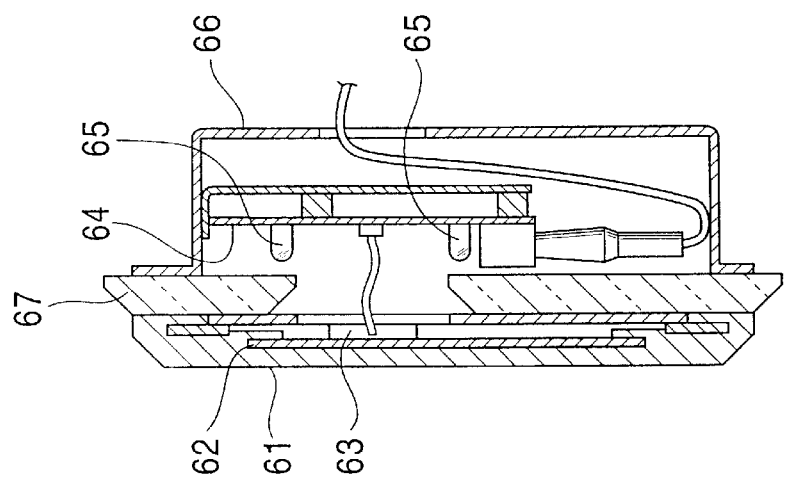
Figure 3A:
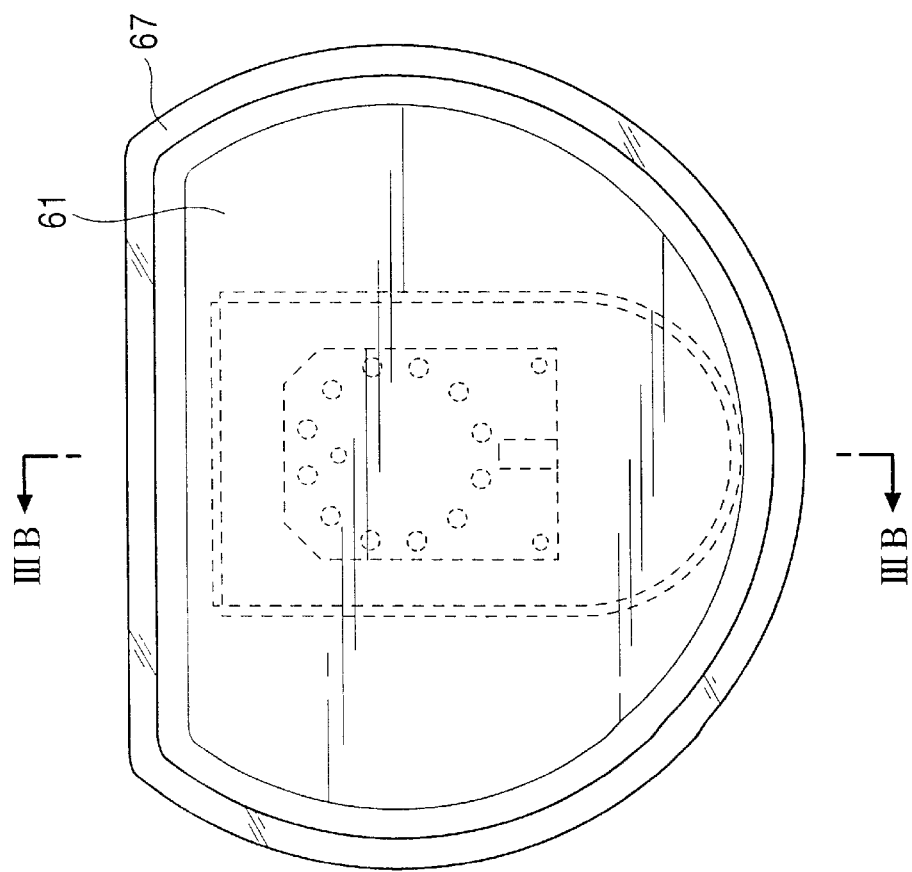

As shown in FIG. 3B which is a cross-section along IIIB—IIIB in FIG. 3A, an inner metal plate 62 is provided at the rear side of the rubber pad 61 of the drum pad at the generally center portion, and a shock sensor 63 is provided to the rear side of the inner metal plate 62. The shock sensor 63 serving as rhythm input detecting means for detecting striking comprises an acoustic sensor, which detects striking of the surface of the rubber pad 61 with a stock at the striking operation timing thereof, and control is performed so as to cause an LED (Light Emitting Diode) 65 to emit light for an instant via a control circuit on the control board 64 due to that detection signal, and further, that detection signal can be externally extracted at the striking operation timing. The control board 64 is stored within a board case 66, and the board case 66 is attached to a transparent acrylic plate 67. The acrylic plate 67 is somewhat larger than the rubber pad 61 shown in FIG. 3A and is provided so as to frame the perimeter thereof in a flange-like manner. The acrylic plate 67 is provided so as to face a circular array of LEDs 65 arrayed on the control board 64, such that the light emitted by the LEDs 65 pass through the acrylic plate 67 and cause the perimeter of the rubber pad 61 to emit light.

Figure 4:
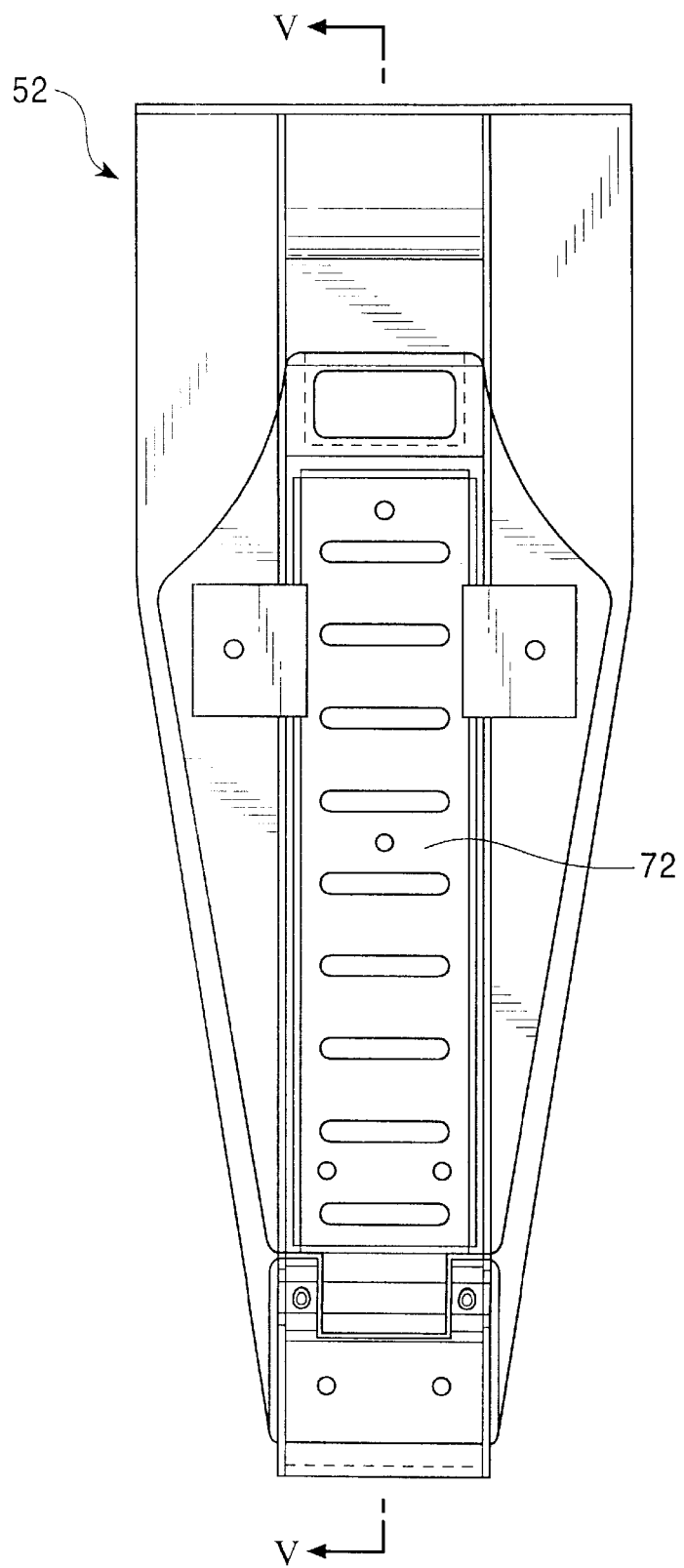
FIG. 4 is a plan view of the foot pedal shown in FIG. 2.
Figure 5:
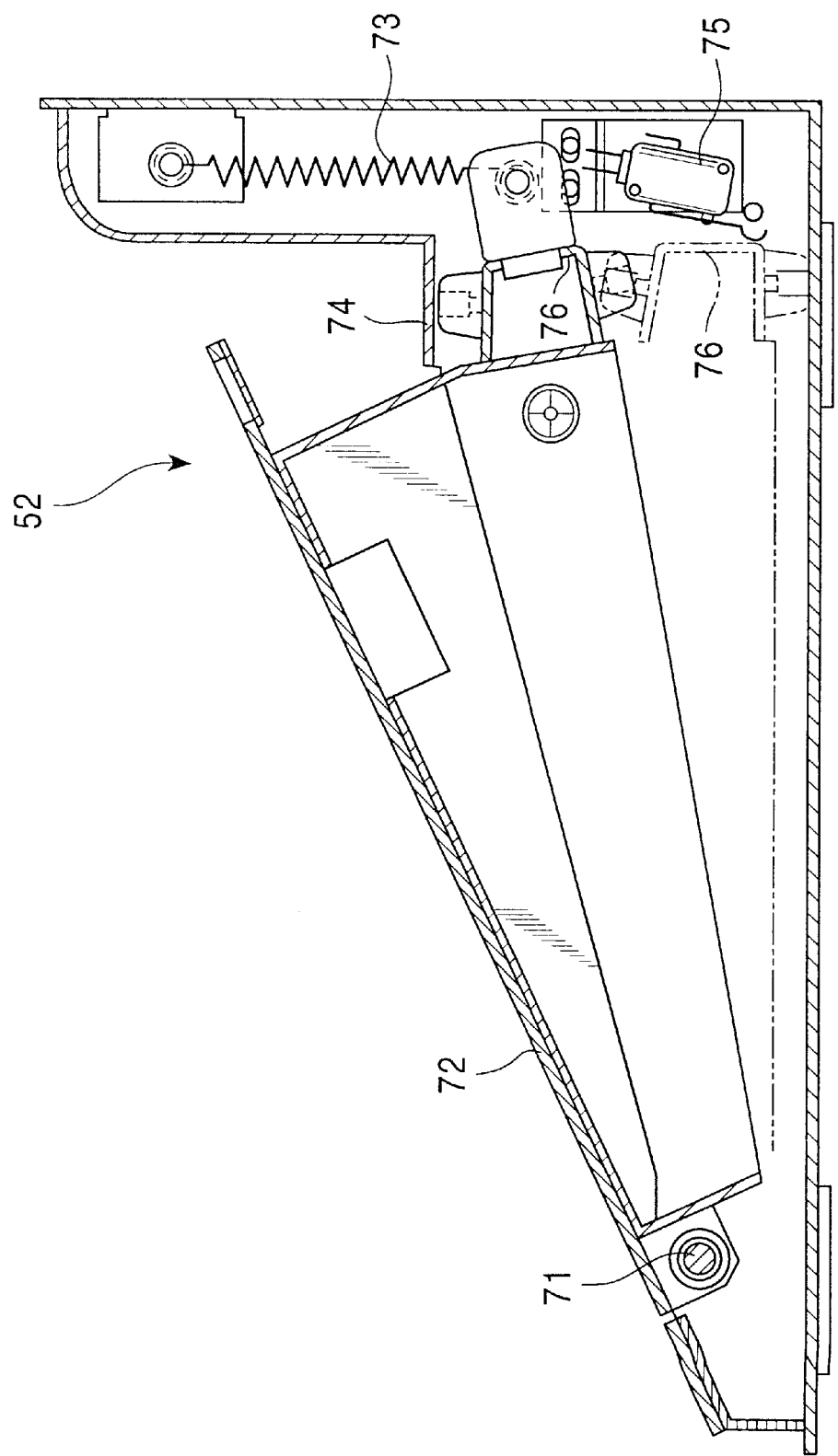
FIG. 5 is a cross-section view along V—V in FIG. 4.

The interior structure of the foot pedal 52 will be described. In FIGS. 4 and 5, the foot pedal 52 has a pedal 72 which has one end thereof axially supported to as to rock vertically with a shaft 71 as the center of rotation thereof, an elastic member 73 which is retained at the tip portion of the pedal 72 at the side opposite to that of the shaft 71, for pressing the pedal 72 upwards, a stopper member 74 for restricting the rotation of the pedal 72 pressed by the elastic member 73, a switch 75 for detecting stepping on the pedal 72, and an actuator 76 for coming into contact with an operating piece of the switch 75 at the time of rotating against the pressing force of the pedal 72 (at the time of stepping, shown by a double-dotted broken line) so as to cause this to move, thereby controlling on/off of the switch 75.

In this way, the configuration is such that one player stands and plays the drum set comprised of the drum pads 47 through 51 and the base drum foot pedal 52 with sticks in both hands along with the rhythm, using both hands and the right foot. The vertical position and inclination angle can be adjusted so that, in the case of playing in a sitting position, the height of the drum set is optimal in the event that a chair is provided and the player sits. That is to say, the frame member 57 to which the drum pads 47 through 49, 50, and 51 making up the inclined mimic percussion instrument array area 46 is axially supported at the deep side and also is configured so as to be vertically movable within a certain vertical range, and can also be adjusted regarding inclination toward the front of the array area 46.

Figure 6:
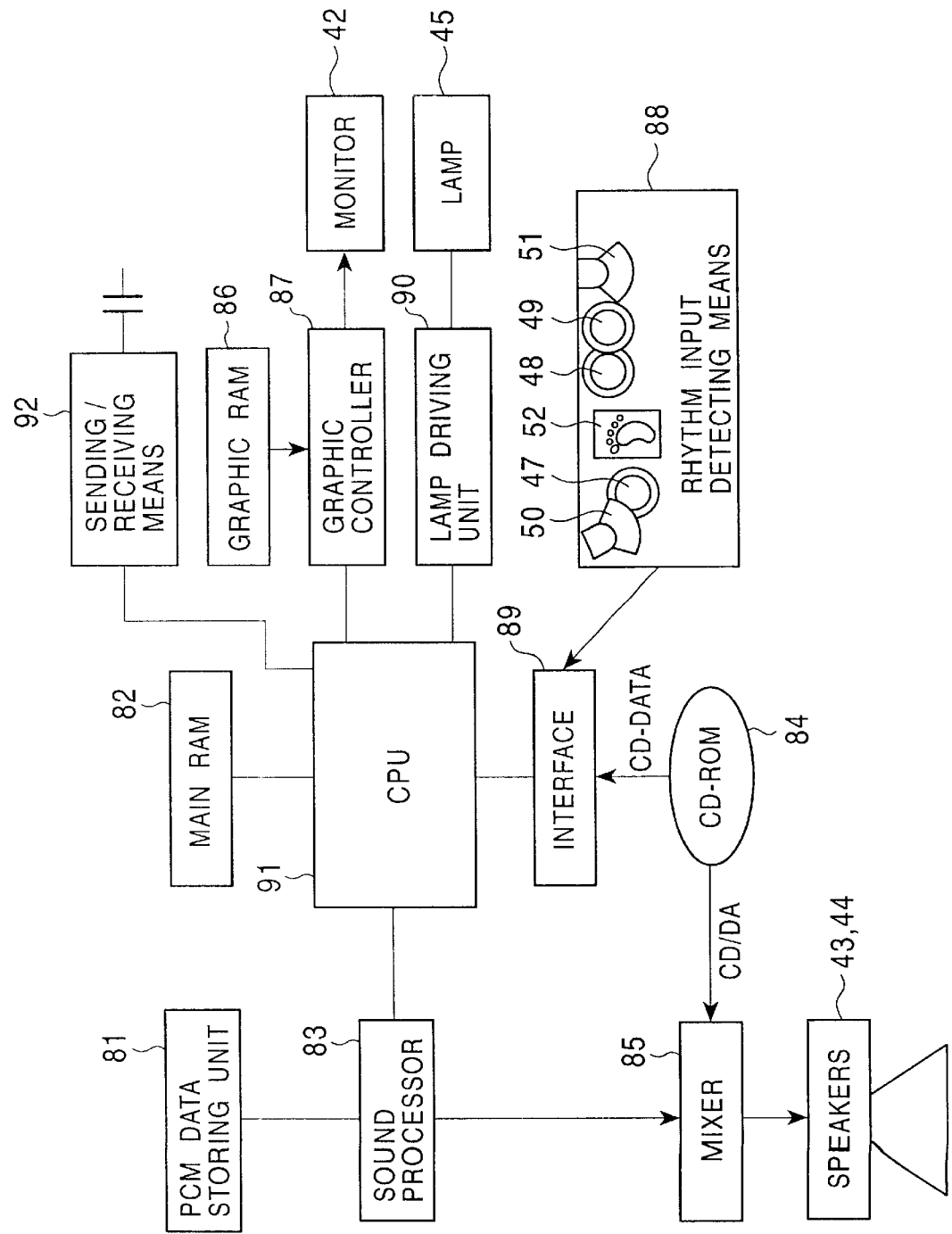
FIG. 6 is a block diagram illustrating the hardware configuration of the drum rhythm game device shown in FIG. 2.

FIG. 6 is a block diagram illustrating an example of the hardware configuration for the drum rhythm game apparatus 2 shown in FIG. 1. In FIG. 6, the hardware configuration for the drum rhythm game apparatus 41 comprises a PCM data storage unit 81, main RAM 82 capable of reading and writing various types of data, a sound processor 83 connected to the PCM data storage unit 81 for extracting later-described sound emission data which has been recorded note by note from the PCM data storage unit 81 and performing sound emission control, a mixing unit 85 connected to the sound processor 83 for mixing the later-described sound emission data from the sound processor 83 and the BGM data from the CD-ROM 84 and outputting this to the speakers 43 and 44 so as to serve as a sound generating means, graphic RAM 86 for storing image data for the monitor 42, a graphic controller 87 connected to the monitor 42 for extracting the image data within the graphic RAM 86 and performing display control thereof on the monitor 42, an interface 89 for receiving input signals from the rhythm input detecting means 88 and the CD-ROM 84, a lamp driving unit 90 which is connected to the lamps 5 for performing lighting driving of the lamps 45, a CPU (Central Processing Unit) 91 for controlling each part, and transmitting/receiving means 92 connected to the CPU 91 and capable of sending and receiving later-described sector Nos. of the BGM data from the CD-ROM 84 by means of the CPU 91. Now, making further description of FIGS. 1 and 6, The CD-ROM 84 makes up the music piece storing unit 21, the interface 89 and CPU 91 make up the reading unit 22, the CPU 91 and the transmitting/receiving means 92 make up the communication unit 23, the monitor 42 makes up the display unit 24, the CPU 91, graphic RAM 86 and graphic controller 87 make up the display control unit 25, the drum pads 47 through 51 and the rhythm input detecting means 88 and the foot pedal 52 make up the staging operating unit 26, the speakers 43 and 44 and the mixing unit 85 make up the sound output unit 27, and the CPU 91 and main RAM 82 make up the evaluating unit and master-slave control unit (not shown). Also, the sound processor 83, CPU 91 and main RAM 82 make up the signal processing unit 27a, the graphic RAM 86 makes up the staging instructions information storing means 29, and the graphic controller 87, CPU 91, and main RAM 82 make up the staging instruction information reading unit 30.

The PCM data storage unit 81 correlates multiple types of sound data (sound data with differing tones or multiple pieces of sound data) with the type of sound and thus stores the sound data. With sound data for such played music pieces, 12 to 15 music pieces for all play levels are stored in the PCM data storage unit 81. Also, with regard to this sound data, information indicating the sector No., sound emission duration, etc., is stored in the PCM data storage unit 81. Also, the graphic RAM 86 stores screens relating to the notes display 93 of the game screen shown in FIGS. 7 and 8, and the CPU 91 controls the graphic controller 87 to divide the rhythm sound (notes bar 94 correlating to the rhythm sound), regarding a played music piece configured containing at least rhythm sound, in certain intervals (may be different or the same for each sound) in the time direction C, and stores note by note as sound data the series of rhythm sounds constructed by distributing multiple types (with the present embodiment, there are 6 types of mimic percussion instruments) of series of rhythm sounds on the same time axis.

Also, the CD-ROM 84 serving as the storage medium stores BGM data for the played music piece, and further stores the selection sound emission data (type of drum pad) for each sound of the played music piece and the output timing data (sound No.), and is configured of a so-called ROM cassette, wherein a ROM or the like storing score data according to the later-described degree of matching with these, as well as program data such as the control programs for the rhythm game and the operating system, is housed inside a plastic case. The recording medium may be configured with an optical disk, flexible disk, etc., instead of the CD-ROM 85.

Figure 7:
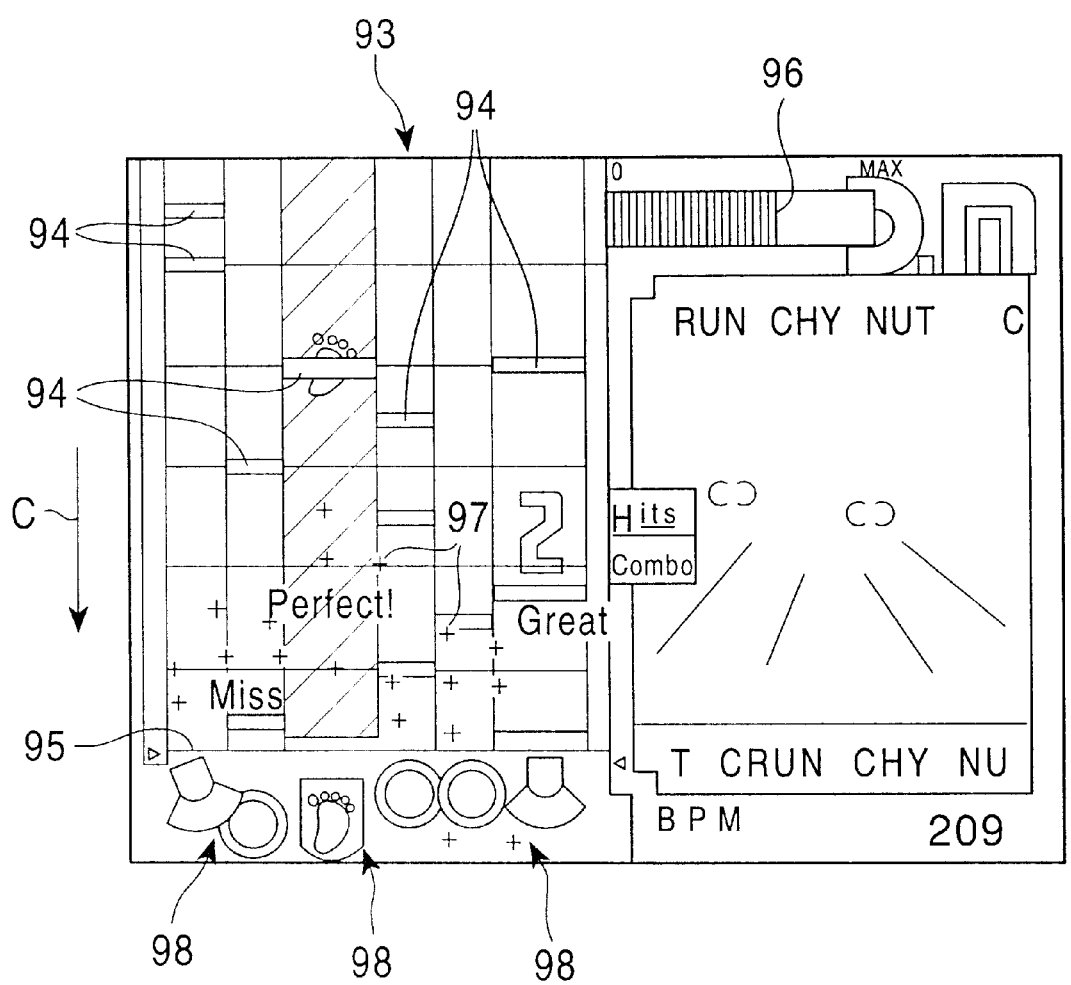
FIG. 7 is a diagram illustrating an example of the game screen displayed on the monitor shown in FIG. 6.
Figure 8:
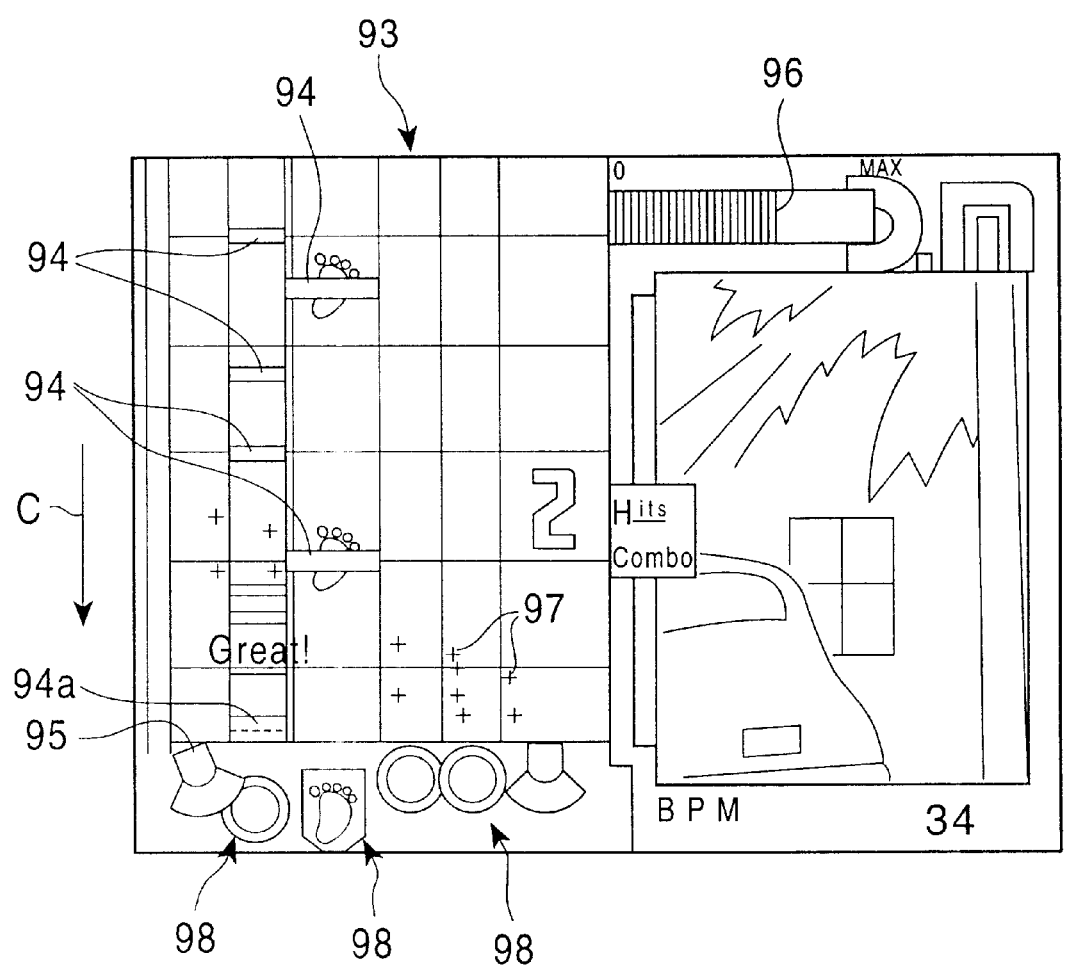
FIG. 8 is a diagram illustrating another example of the game screen displayed on the monitor shown in FIG. 6.

Further, as with the PCM data storage unit 81, the graphic RAM 86 stores data for the notes screen 93 such as shown in FIGS. 7 and 8 for example for performing display instruction of rhythm striking input, for visually guiding the rhythm striking input by the type of mimic percussion instrument. That is, the notes screen 93 such as shown in FIGS. 7 and 8 is displayed as notes bars 94 which are operating timing components for each rhythm sound corresponding to each played music piece (BGM), the series of notes bars 94 indicating a series of rhythm sounds being arrayed in the vertical direction, such that the notes bar for each rhythm sound sequentially moves downwards along with each played music piece progressing and displays and instructs the operating timing for the player to operate as the timing at which the notes bar for each rhythm sound reaches a horizontal reference line. The display instruction of the operating timing arrayed vertically in such a manner is lined up and displayed sideways by the type of mimic percussion instrument, and at the bottom of each vertical array there is a mark 98 displayed for the mimic percussion instrument corresponding thereto. The vertical array of a series of rhythm sounds, i.e., the mark array of mimic percussion instruments matches the array of the drum pads 47 through 51 of the actual drum rhythm game apparatus 2. Also, the graphic RAM 86 stores screens dealing with game states as shown below (e.g., see FIGS. 7 through 16) and various types of data relating thereto, in addition to the data for the notes screen 93.

The CPU 91 reads data relating to the program data within the CD-ROM 85 (score data, selection generation sound data, output timing data, etc.) from the CD-ROM 85 at the time of start-up, with an unshown reading device, and writes this to the main RAM 82.

Figures 9, 10:
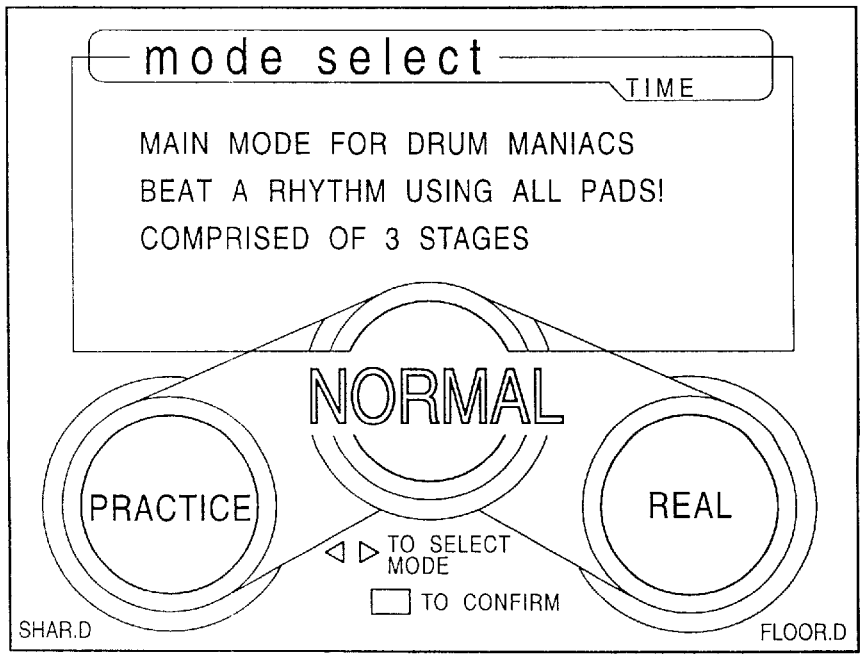
FIG. 9 is a diagram illustrating an example of the warning screen displayed on the monitor shown in FIG. 6.
FIG. 10 is a diagram illustrating an example of the normal mode having been selected in the mode selection screen displayed on the monitor shown in FIG. 6.
Figure 11:
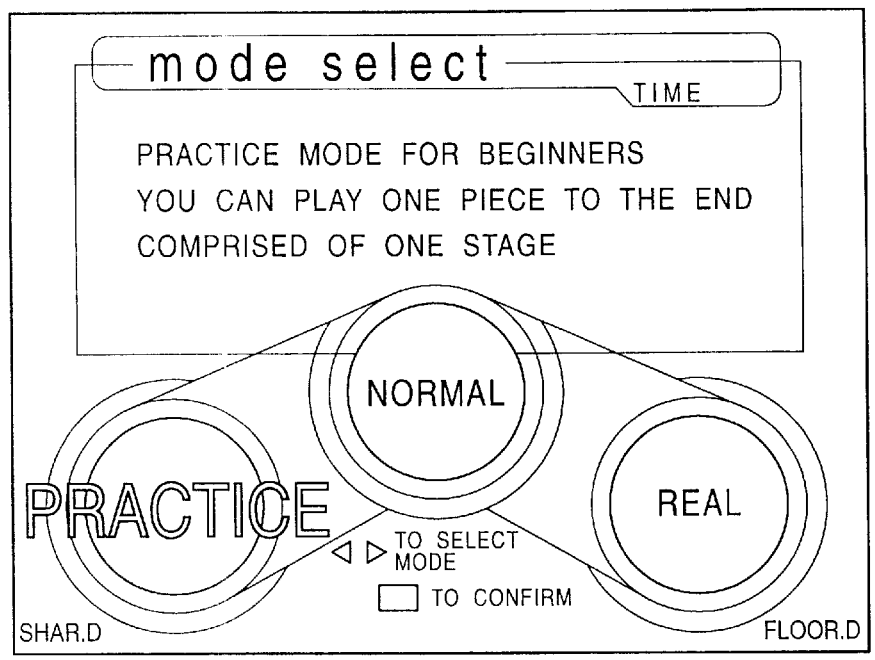
FIG. 11 is a diagram illustrating an example of the practice mode having been selected in the mode selection screen displayed on the monitor shown in FIG. 6.
Figure 12:
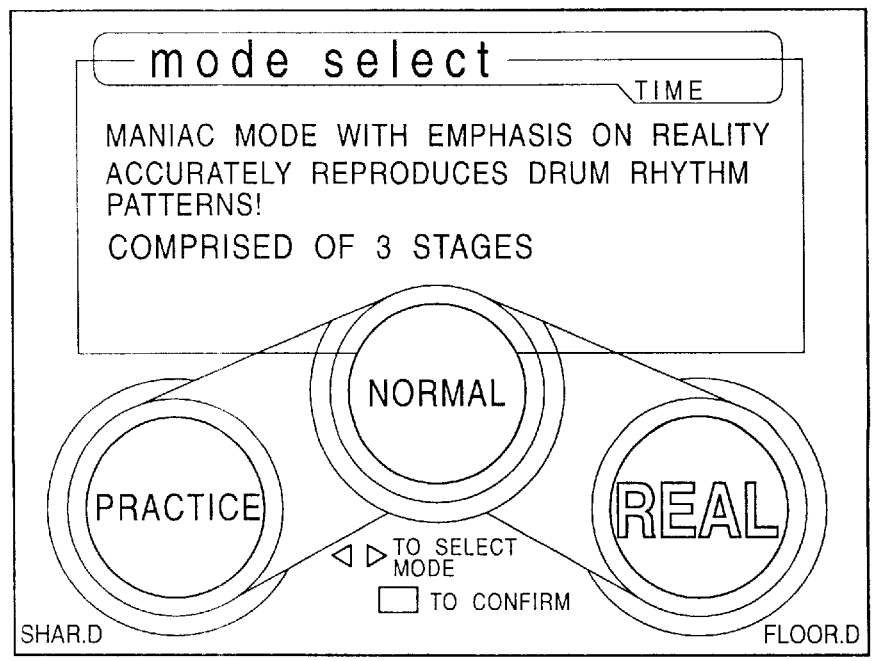
FIG. 12 is a diagram illustrating an example of the real mode having been selected in the mode selection screen displayed on the monitor shown in FIG. 6.
Figure 13:
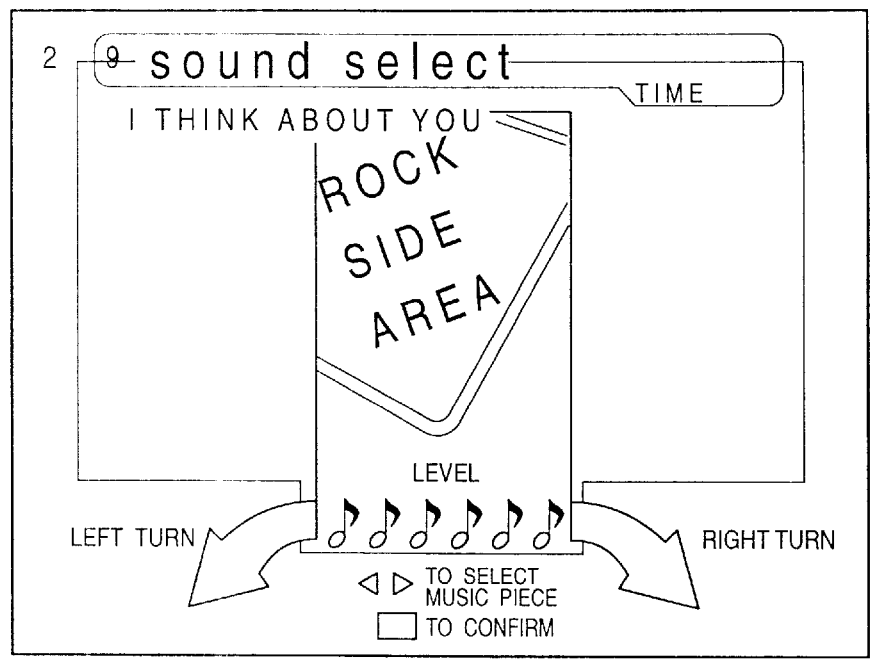
FIG. 13 is a diagram illustrating an example of the sound selection screen displayed on the monitor shown in FIG. 6.
Figure 14:
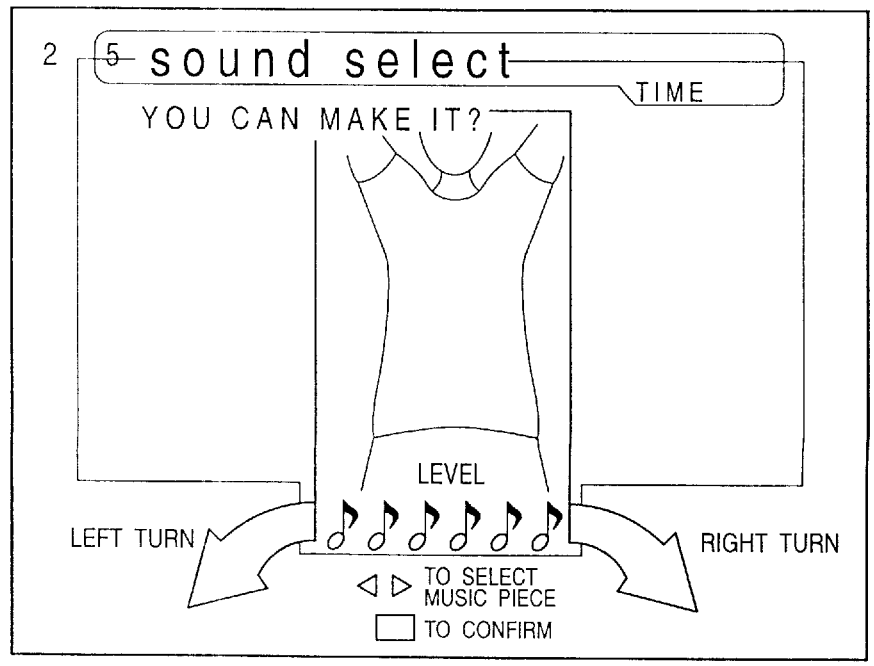
FIG. 14 is a diagram illustrating another example of the sound selection screen displayed on the monitor shown in FIG. 6.
Figure 15:
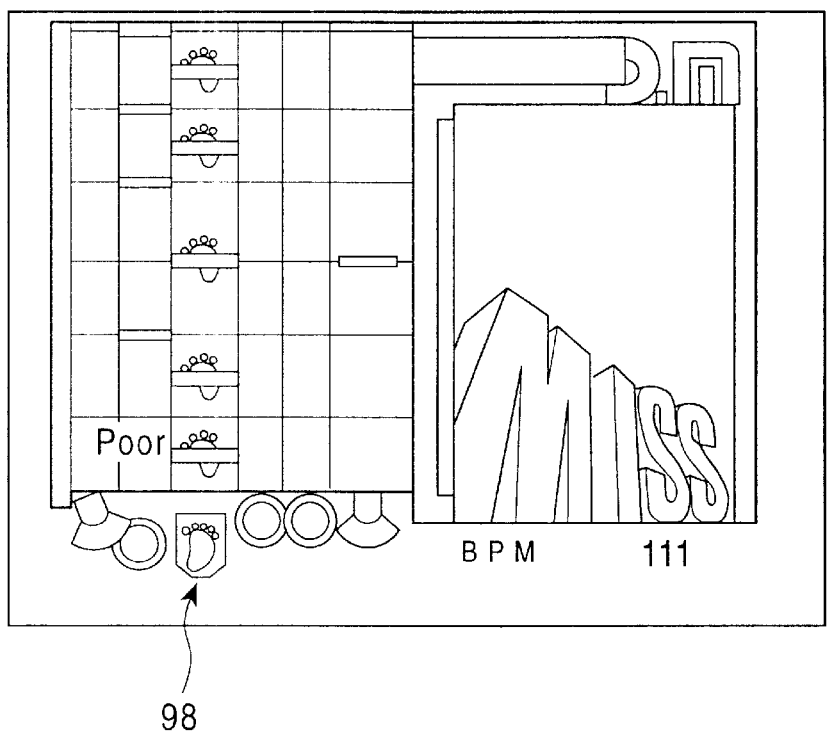
FIG. 15 is a diagram illustrating an example of the miss screen displayed on the monitor shown in FIG. 6.

Also, based on the control program, the CPU 91 controls the graphic controller 87 and extracts necessary image data (mode selection screen) from the graphic RAM 86 which is displayed on the monitor 42, and performs the mode difficulty selection processing and the stage selection processing, by means of the player making selection with the selection buttons 54 and 55, and confirming with the confirm/start button 53. Based on the instruction command from the player with the selection buttons 54 and 55, mode selection screens such as shown in FIGS. 10 through 12 or sound selection screens such as shown in FIGS. 13 and 14 are displayed. Incidentally, regarding the mode difficulty selection processing, the present embodiment uses the selection buttons 54 and 55 and the confirm/start button 53, as described above, but the present invention is not restricted to such; rather, an arrangement may be used wherein the difficulty mode is selected by the player striking the drum pads 47 through 49 and confirming the selected mode with the foot pedal 52. For example, the mode selection screen shown in FIG. 10 would be come up in the event the normal mode is selected by striking the drum pad 47 with a stick, the mode selection screen shown in FIG. 11 would be come up in the event the practice mode is selected by striking the drum pad 48 with a stick, and the mode selection screen shown in FIG. 12 would be come up in the event the real mode is selected by striking the drum pad 49 with a stick.

In the mode difficulty selection processing, there are four modes provided; the practice mode for beginners, the normal mode for medium level, the real mode for advanced, and the expert mode which is the highest level. With the practice mode or normal mode, the combinations of hands and feet are restricted to basically only both hands, or to the right foot and left hand (or right hand), and the setting is arranged such that similar rhythm patterns are repeated due to the nature of the beginner level, with occasional feint rhythms and phrases with increasing complexity making for the nature of the game. Also, with the real mode and expert-real mode, fast tempo and advanced level stick-handling using at least both hands is required, and the setting is arranged such that the game nature is a challenge for advanced buffs. Particularly, with the expert-real mode, the touch intensity in striking the drum pad is required. That is to say, the judgement evaluation in the rhythm game is not only for the timing for the drum pad striking operation, but touch intensity of the striking operation is contained in the judgement evaluation as well.

Also, with the stage selection processing, a sound selection screen such as shown in FIGS. 13 and 14 displayed on the monitor 42, and is arranged such that the player selects the played music piece using the selection buttons 54 and 55 and the title displayed on the display screen is confirmed as the selected music piece with the confirm/start button 53. Also, note symbols corresponding to the difficulty level of the played music piece are arrayed horizontally and displayed on the monitor 42. Each time the selection button 54 is pressed, the title corresponding to the next played music piece is displayed on the monitor 42. Also, each time the selection button 55 is pressed, the movement is in the reverse direction (to the right) as compared to the selection button 54. For example, the title portion of the screen on the monitor 42 shown in FIG. 13 has displayed the title "I THINK ABOUT YOU" of the played music piece, and this is in a state of being selected. In the event that this selected piece is suitable, the confirm/start button 53 is pressed following the operation guidance on the display screen, and the played music piece is confirmed.

Also, the CPU 91 comprises: judging means for judging whether or not sound data according to the type of mimic instrument input-detected and input-instructed with the drum pads 47 through 51 and bass drum foot pedal 52 has been instructed as striking or pedal operation timing within the certain interval, following the sound generation output control procedures of the control program; and sound output control means for extracting one piece of sound emission data of a played music piece from the PCM data storage unit 81 with the sound processor 83 according to the type of mimic percussion instrument from the drum pads 47 through 51 and foot pedal 52, and the output timing thereof (sound No.), and outputting this to the mixing unit 85, mixing the one piece of sound emission data and the BGM data from the CD-ROM 84 and conducting sound emission output from the speakers 43 and 44, in at least a state that the judging means has affirmed (instructed as striking or pedal operating timing within the certain interval); and has display control means for updating the data on the notes screen 93 according to the flow of the time-system of the played music piece, and also for performing display control on the monitor 42 regarding the level of matching in the striking with the sticks or pedal operation on the mimic percussion instruments such as the later-described "Perfect", and whether or not there has been a miss in the input, following the notes display control means of the control program; and rhythm input operation evaluating means for comparing the timing of the striking or pedal operation on the mimic percussion instruments with the sound emission data for playing and output timing data, and for evaluating the rhythm input from the score data according to the latter-described degree of matching, thereby adding to the score, following the rhythm input operation evaluation procedures of the control program. The sound output control means has a later-described offset amount detecting means and sound emission control means.

The sound output control processing and display control processing will be described in detail. The CPU 91 obtains the sector No. from the CD-ROM 84 via the interface 89, and controls the graphics controller 87 based on the obtained CD sector No. to read in image data from the graphic RAM 86 which is the graphic storage means and updates the next notes display 93, and displays the updated notes display 93 on the monitor 42 as shown in FIGS. 7 or 8. That is to say, the configuration is such that, during execution of the program, the sector No. which the CD head is pointing to is obtained for each interruption, and the notes display 53 shown in FIGS. 7 or 8 is moved downwards according to the time value of that sector No., and performs sound input display instruction for the player to conduct striking with the stick or pedal operation for the notes bar 94 (notes bars 94 for each of the mimic percussion instrument drum pads 47 through 51 and foot pedal 52) which has reached the reference line 95.

In this way, the player inputs command signals to the CPU 91 by striking the mimic percussion instrument drum pads 47 through 51 with sticks held in the right and left hands or operating the foot pedal 52 with the pedal, along with the BGM, while confirming the notes display 93 to the left side of the monitor 42 in FIGS. 6 or 7, for example. At this time, at the point that there has been input of the command signal within the certain timing period, the CPU 91 calculates the degree of matching with the time-sequence data in a table.

Figure 17:
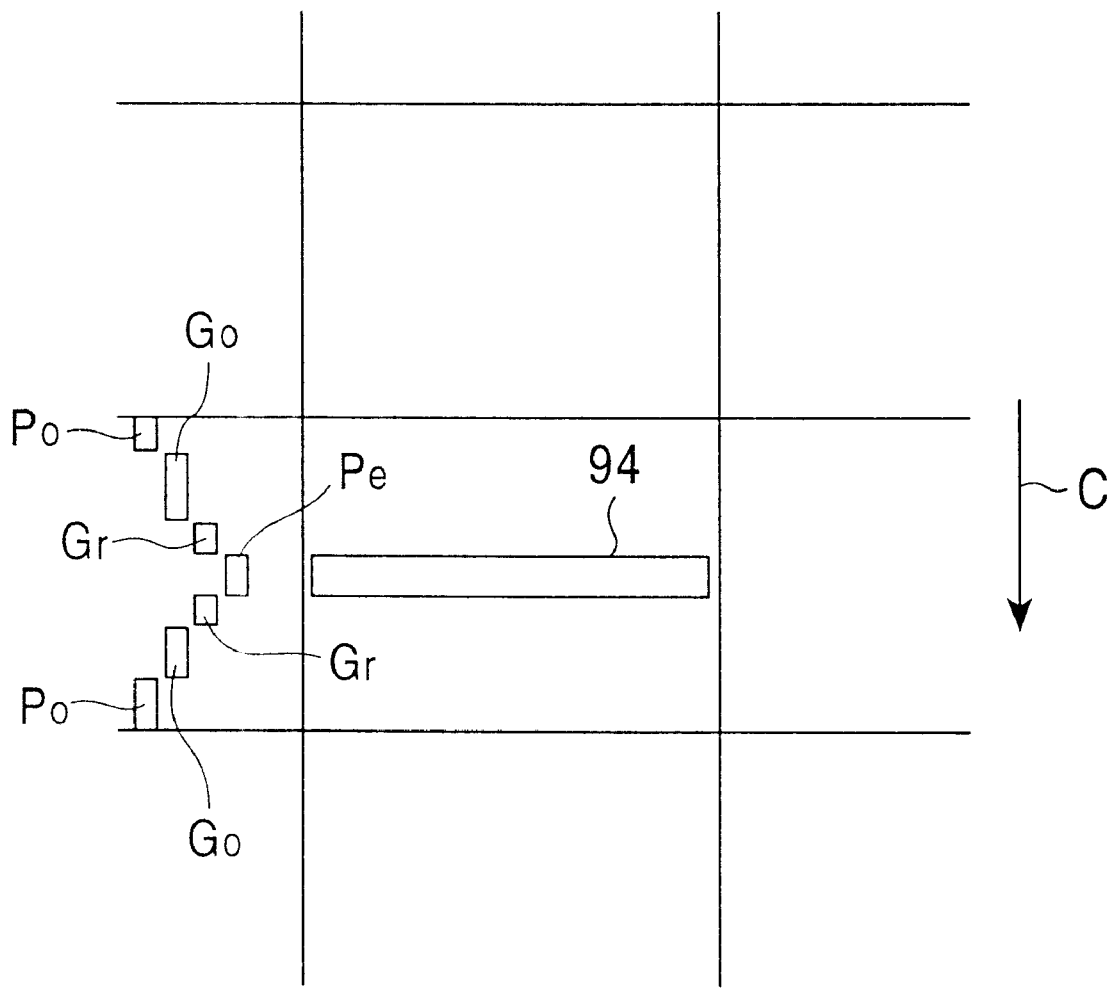
FIG. 17 is a notes display diagram for explaining the stepped evaluation regarding timing offset for the striking or pedal operation as to the notes bar.

This degree of matching (amount of matching) is the extent to which the input timing of striking the mimic percussion instrument drum pads 47 through 51 with sticks or operating the foot pedal 52 with the pedal matches the display instruction timing displayed as notes. For example, this sound output is such that in the event that the sector No. obtained at the time of stick striking or pedal operating and the sector No. of the corresponding time-sequence data are within a certain interval, and also in the event that the input instruction has been made from the same type of mimic instrument (drum pads 47 through 51 and foot pedal 52) in matching amount table, the sound data corresponding to the sound No. within the same matching amount table is output as sound for the duration of the sound emission thereof. In the event that the "within the certain interval" consists of within the time width Pe which is generally the same as the sound duration corresponding to the notes bar 94 in the notes display 93 as shown in FIG. 17, this makes for a evaluation level of "Perfect" from multiple matching levels (with the present embodiment there are 4 evaluation levels) set, in the event that this is within the time width Gr set before and after the time width Pe, this consists of "Great", in the event that this is within the time width Go set before and after the time width Gr, this consists of "Good", and in the event that this is within the time width Po set before and after the time width Go, this consists of "Poor". The superiority or inferiority of this evaluation level is displayed to the player by changes in graphics representing the notes, or temporarily displaying characters representing the evaluation. Also, the time width at the trailing side of this "Poor" has been made to be somewhat longer than as compared with other time widths (the time width set for "Perfect", "Great", and "Good"), and the time width of a pedal operation has been made to be somewhat longer than as compared with other time widths (the time width set for the striking operation). Also, in the event that the player misses a notes bar 94 and does not perform the striking or pedal operation, i.e., in the event that there is no input instruction within the certain interval, this constitutes a "Miss", so that a strike outside of the time width Po in the free zone (the inter-line area time-divided every 16 notes, where no notes bars 94 exist), there is no judgement. An arrangement may be made wherein there is no output of rhythm sound even in the event that the player ad-libs and performs strike inputting in this free zone, but with the present embodiment, a warning sound (a miss sound) for notifying that the operating timing is off, is output. In this way, a warning sound (a miss sound) is output in the event that the amount of offset in degree of matching is great, and in the event that this is not the case, a normal sound chord is sounded. Also, the warning sound (miss sound) is an appropriate combination of normal sound chords, and a sound that is not irksome is preset for each music piece or mode.

In the event that there is striking or pedal operation within the "Perfect" or "Great" time, fireworks 97 indicating congratulation are displayed on the notes display screen as shown in FIGS. 7 and 8, and the halogen lamps 45 blink, with the characters "Perfect" or "Great", indicating the degree of matching, flowing along the vertical lines of the mimic instrument, and the mark 98 of the mimic instrument shining.

At this time, the notes bar 94a itself blinks intensely only for the instant of the striking or pedal operation, as shown by the notes bar 94a which has reached the reference line 95. Also, in the event that there is striking or pedal operation within the "Good" or "Poor" time width, the characters "Good" or "Poor" are displayed on the vertical display area in the notes display 93 for the mimic instrument which was operated, and only the perimeter of the mark 98 for the mimic percussion instrument which was "Good" or "Poor" shines. Further, in the event that the strike or pedal operation is within the certain time interval, in the event that the type of mimic instrument is wrong, there is no sound output, and no related display. The display on the monitor 42 at this time is also "MISS" shown in FIG. 15 which represents a miss, on the vertical line for the mimic instrument. In this way, the sound data for the sound which the player has selected the mimic instrument at the input instruction timing of striking the mimic instrument with the stick or pedal operation is obtained by the CPU 91 controlling the sound processor 83 from the PCM data storage means 41, and the sound is emitted via the speakers 43 and 44.

Also, the vertical line of the display instruction for the pedal operation is shining white, and further the vertical line for the pedal operation is positioned at the general center, so the visual recognition thereof is much better than that of the other drum pads.

The rhythm input operation evaluating process with be described in detail. The CPU 91 follows the rhythm input operation evaluation procedures of the control program and the game data to extract and calculate score points from the scores table according to various conditions, such as the amount of offset from the reference timing range of the input instruction timing of striking the mimic instrument with the stick or pedal operation (the levels in degree of matching), mistakes in the type of mimic percussion instrument at this time, whether or not a series of continuous operation inputs are of a certain level in the degree of matching (bonus points are set for cases wherein there is continuous operation input within the time width of "Perfect" and "Great"), cases wherein there is no input of instruction signals which should have been within the certain timing period. For example, in the event that the operation timing of the instruction signals is within the same time width Pe as to the notes bar 94 of the notes display 93, this is "Perfect" and this is +2, in the event this is within time width Gr, this is "Great" for +1, in the event this is within time width Go, this is "Good" for ±0, in the event this is within time width Po, this is "Poor" for −5, and in the event that the striking or pedal operation is not performed but the notes bar 94 is missed, this is "Miss" for −10. In the event that the degree of matching is off any greater than this, the judgement does not count.

Figure 16:
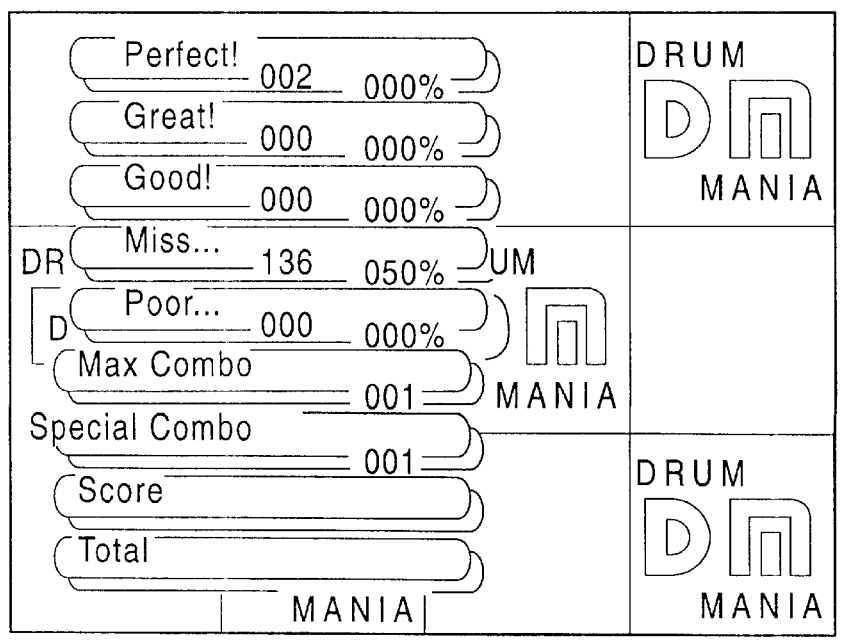
FIG. 16 is a diagram illustrating an example of the grades display screen displayed on the monitor shown in FIG. 6.

Also, the CPU 91 is arranged so that accumulation calculation is performed such that the gauge amount is decreased in the event that the operation timing of the player to the mimic percussion instrument is within the "Poor" time width or in the case of a "Miss", and the gauge amount is increased in the event that the operation timing is within the "Perfect" or "Great" time width. Based on the gauge amount calculation results and the score calculation results, the calculating score is added to the accumulated score and updated and stored in the main RAM 82, and at the same time the calculated gauge amount is reflected in a horizontal bar graph 96 on the monitor 42 as shown in FIGS. 7 and 8, with the length thereof in a certain direction being changed and thus displayed accordingly. The CPU 52 controls the graphic controller 87 such that in the event that the updated gauge amount is gone, a display such as "Game Over" is displayed on the monitor 42 and the rhythm game is force-quit, and a grades display screen such as shown in FIG. 16 for example is displayed on the monitor 42.

Now, a specific example of the guitar rhythm game apparatus 3 will be described below in further detail.

Figure 18:
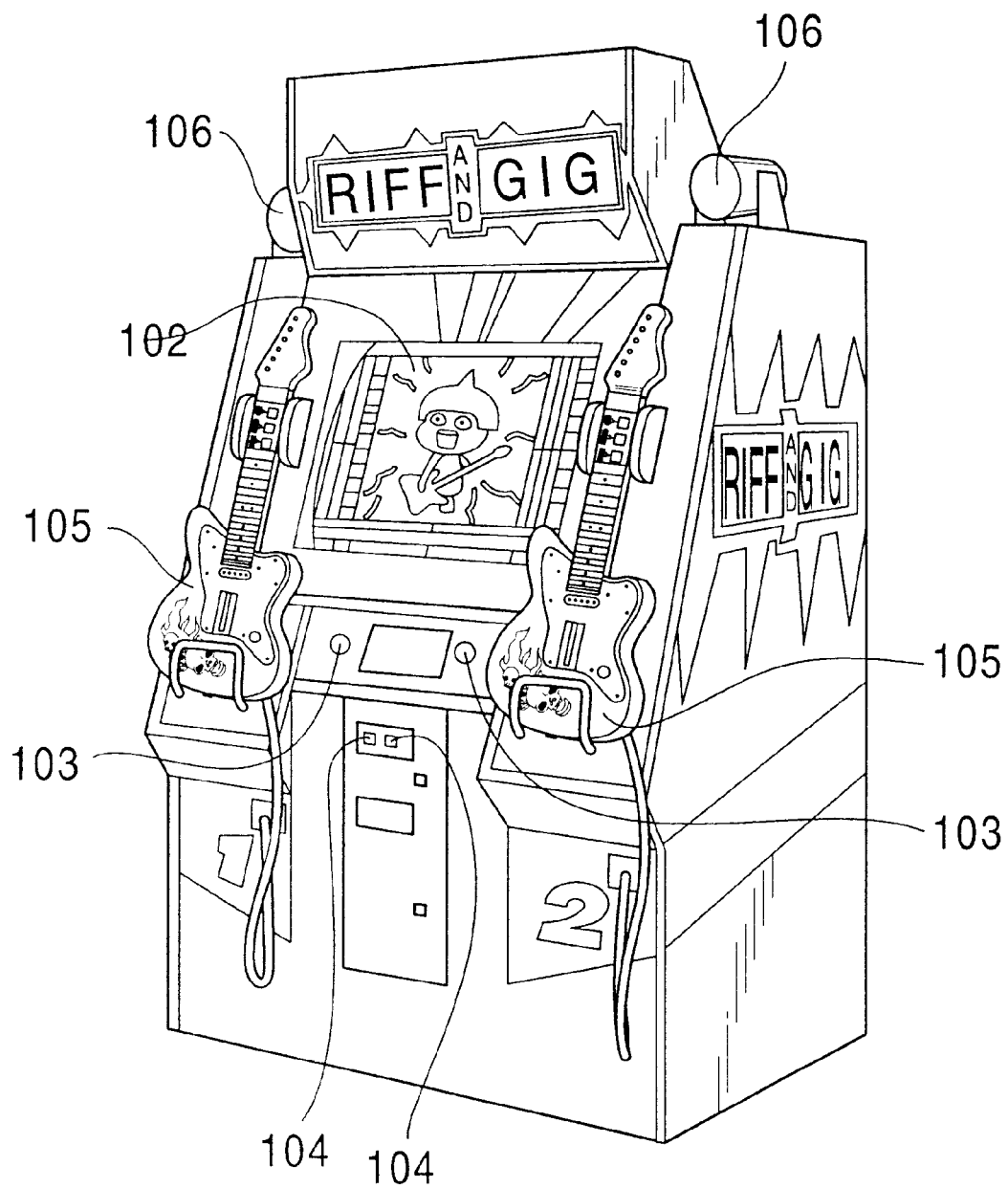
FIG. 18 is an external perspective view of the guitar rhythm game apparatus shown in FIG. 1.

FIG. 18 is an external perspective view of an example of the guitar rhythm game apparatus 3 shown in FIG. 1. In FIG. 18, the guitar rhythm game apparatus 3 has a certain degree of angle at the front upper portion of the housing, and a monitor 102 for outputting various types of images relating to the rhythm game is provided to the center position of the inclined plane. Also, start buttons 103 are provided to the left and right at the near side below the monitor 102, with two coin deposit openings 104 being provided to the lower side thereof on the right and left. Further, mimic guitars 105 which are mimic instruments serving as the staging operating unit 36 for the players to perform rhythm input for sound emitting operation are provided to both the left and right sides of the monitor 102, respectively. Further, halogen lamps 106 for staging effects for the played music piece are provided on the housing above the monitor 102.

In this way, two mimic guitars 105 are provided together, so that two players can each conduct input operation of each mimic guitar 105 and play the rhythm-matching game, or that one player can conduct operation of one mimic guitar 105 and play the rhythm-matching game. Whether one player or two players will play is determined by depositing a certain monetary value in both coin deposit openings 104 to the left and right, or by depositing a certain monetary value in one.

Figure 19:
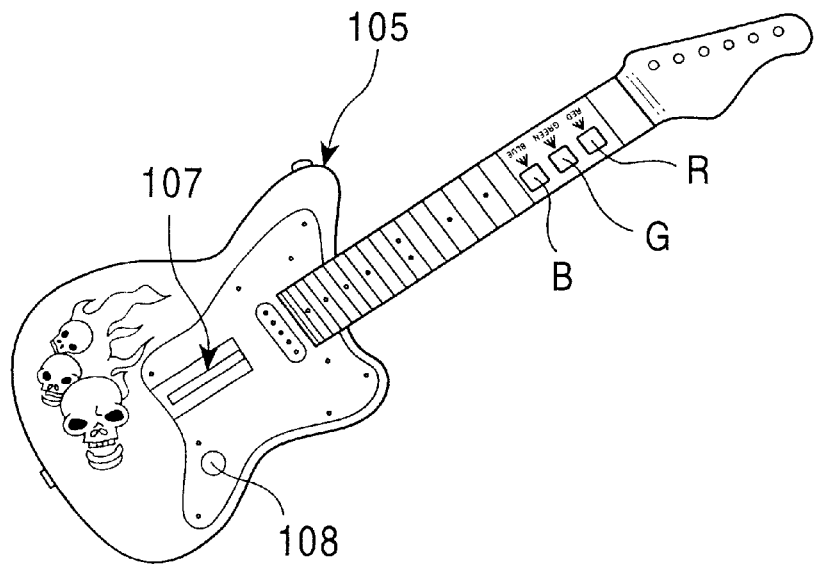
FIG. 19 is a configuration diagram of the mimic guitar shown in FIG. 18.
Figure 20:
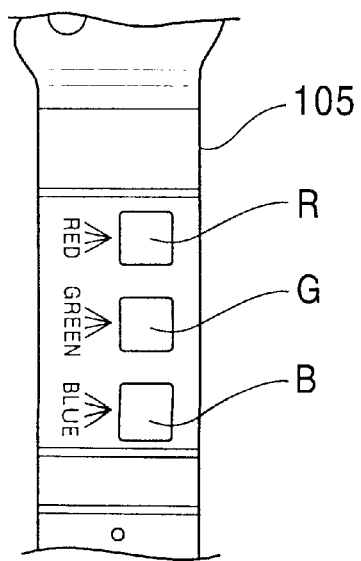
FIG. 20 is an enlarged diagram of the neck portion shown in FIG. 19.
Figure 21:
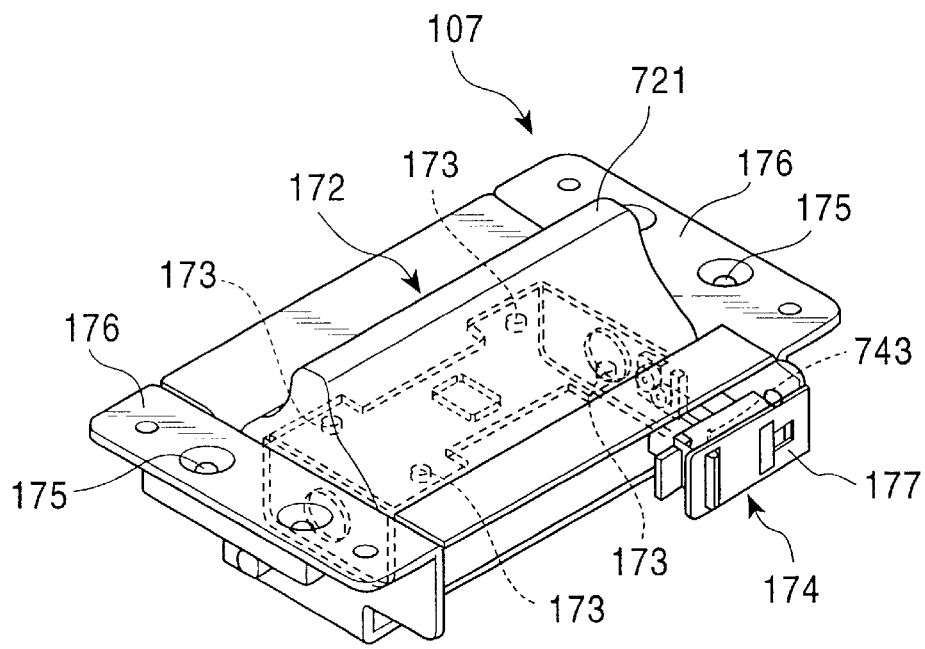
FIG. 21 is a perspective view of the picking input means attached to the mimic guitar shown in FIG. 19.
Figure 22:
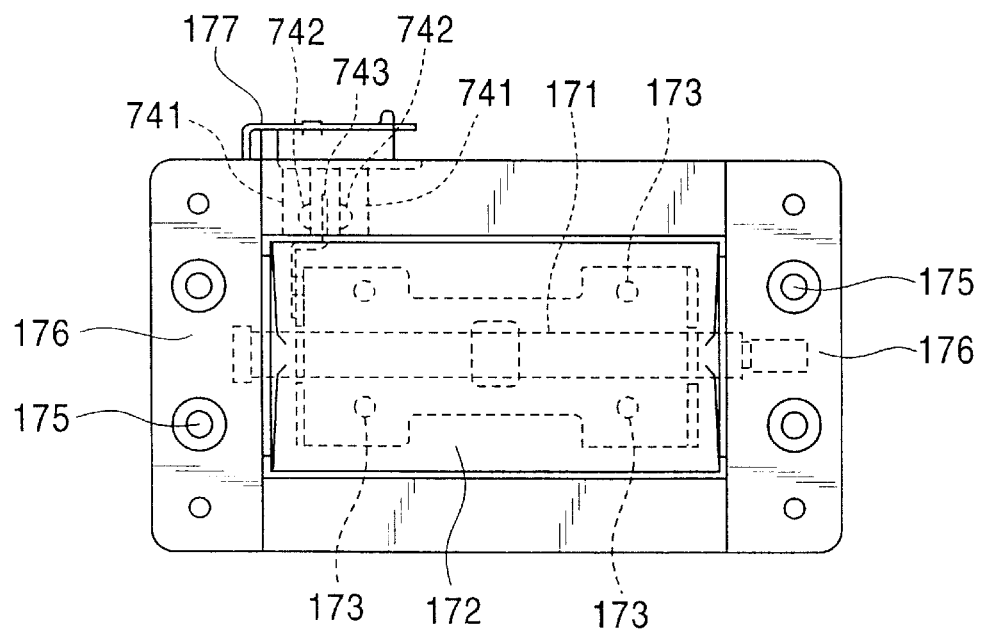
FIG. 22 is a plan view of the picking input means shown in FIG. 21.
Figure 23:
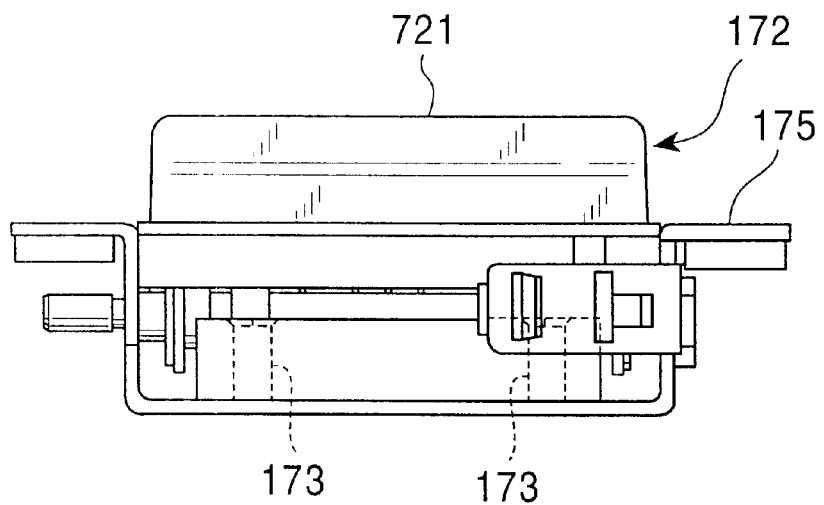
FIG. 23 is a frontal view of the picking input means shown in FIG. 21.
Figure 24:
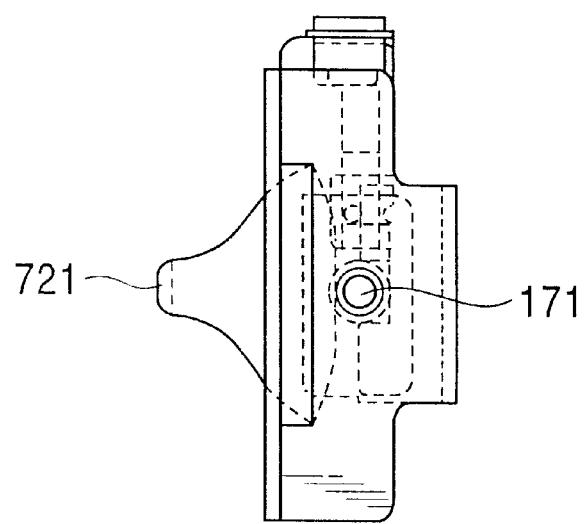
FIG. 24 is a side view of the picking input means shown in FIG. 21, in the usage state.
Figure 25:
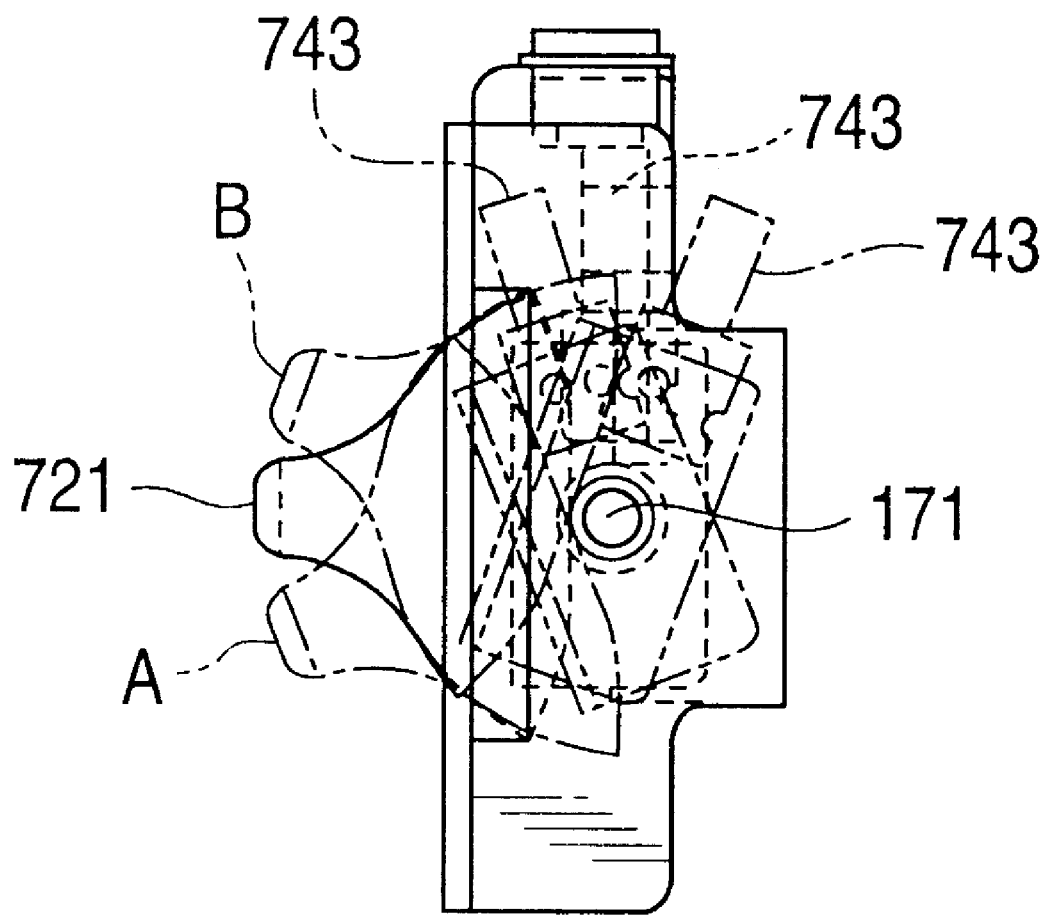
FIG. 25 is a diagram illustrating the movement at the time of picking the picking input means in FIG. 21.

FIG. 19 is a configuration diagram of the mimic guitar 105 shown in FIG. 18, and FIG. 20 is an enlarged diagram of the neck portion shown in FIG. 19. In FIGS. 19 and 20, the mimic guitar 105 has three neck buttons R, G, and B, serving as the rhythm sound selecting means (auxiliary operating member) for selecting the type of rhythm sound for each sound following the time-wise flow of the played music piece from the plurality of rhythm sounds of the played music piece, picking input means 107 serving as output timing determining means (sound generating instructing member) for determining the output timing of the output sound emitting instructing signal by the selecting operation of at least one neck button of these neck buttons R, G, and B, and a rotary switch 108 provided lower than the picking input means 107 for switching added modes such as the echo mode (wherein generally the same type of sounds are output in an offset manner) and chorus mode (wherein different types of sounds are output generally at the same time). These neck buttons R, G, and B are left-hand input means for inputting guitar chords and the like, and the picking input means 106 is a right-hand input means for inputting guitar picking; the left-hand and right-hand arrangements may be reversed.

FIGS. 21 through 25 are configuration diagrams of the picking input means 107 attached to the mimic guitar 105 in FIG. 19. In FIGS. 21 through 25, the picking input means 107 comprises a picking blade 172 wherein the tip portion of a rib-shaped piece 721 is turnably axially supported in the longitudinal direction centered around a shaft 171 within a certain angle range, an elastic member 173 which is positioned at the base portion of the picking blade 172 and serves as a pressing means for pressing such that the tip portion of the rib-shaped piece 721 automatically returns so as to face outwards, turning detecting means 174 serving as vibration detecting means for detecting the turning of this picking blade 172, and an attachment plate 176 with attachment holes 175 for attaching to the main body of the mimic guitar 105, wherein sound emitting signals are output for the first turning detecting timing of the picking plate 172 by the turning detecting means 174 as the sound emitting instructing timing.

This elastic member 173 may be a compression spring, or may be an elastic material such as rubber. Here, the elastic member 173 is provided at four corners, so as to uniformly press the base portion of the picking blade 172 and maintain the balance thereof. Picking the rib-shaped piece 721 downwards as indicated by the imaginary line A shown in FIG. 25, causes the two elastic members 173 to the lower side to be compressed, and the two elastic members 173 to the upper side are stretched, so that the pressing force of the elastic members 173 on the picking blade 172 acts to cause the rib-shaped piece 721 to rock upwards as indicated by the imaginary line B shown in FIG. 25.

Also, as shown in FIG. 5, the turning detecting means 174 has opposingly-positioned element attaching members 741 attached to the attachment plate 176 with a holding member 177 introduced therebetween, transmitting photo-sensors 742 positioned to the element attaching members 741 so that the photo-emitting side and photo-receptor side are arranged in an opposingly facing manner, and a light-shielding piece 743 movable between the photo-emitting side and photo-receptor side, such that in the event that the picking blade 172 is stationary the light-shielding piece 743 shields the photo-sensor 742 so the photo-sensor 742 is in an off state, and in the event that the rib-shaped piece 721 is picked the light-shielding piece 743 moves in accordance with the rocking of the picking plate 172 and a sound emitting instructing signal is output at the point the photo-sensor 742 turns off. The output timing of this sound emitting instructing signal is a certain interval from the first off time following the photo-sensor 742 turning on. This is in order to approximate the state of an actual guitar string being picked to emit sound, in order to create a more realistic atmosphere.

Figure 26:
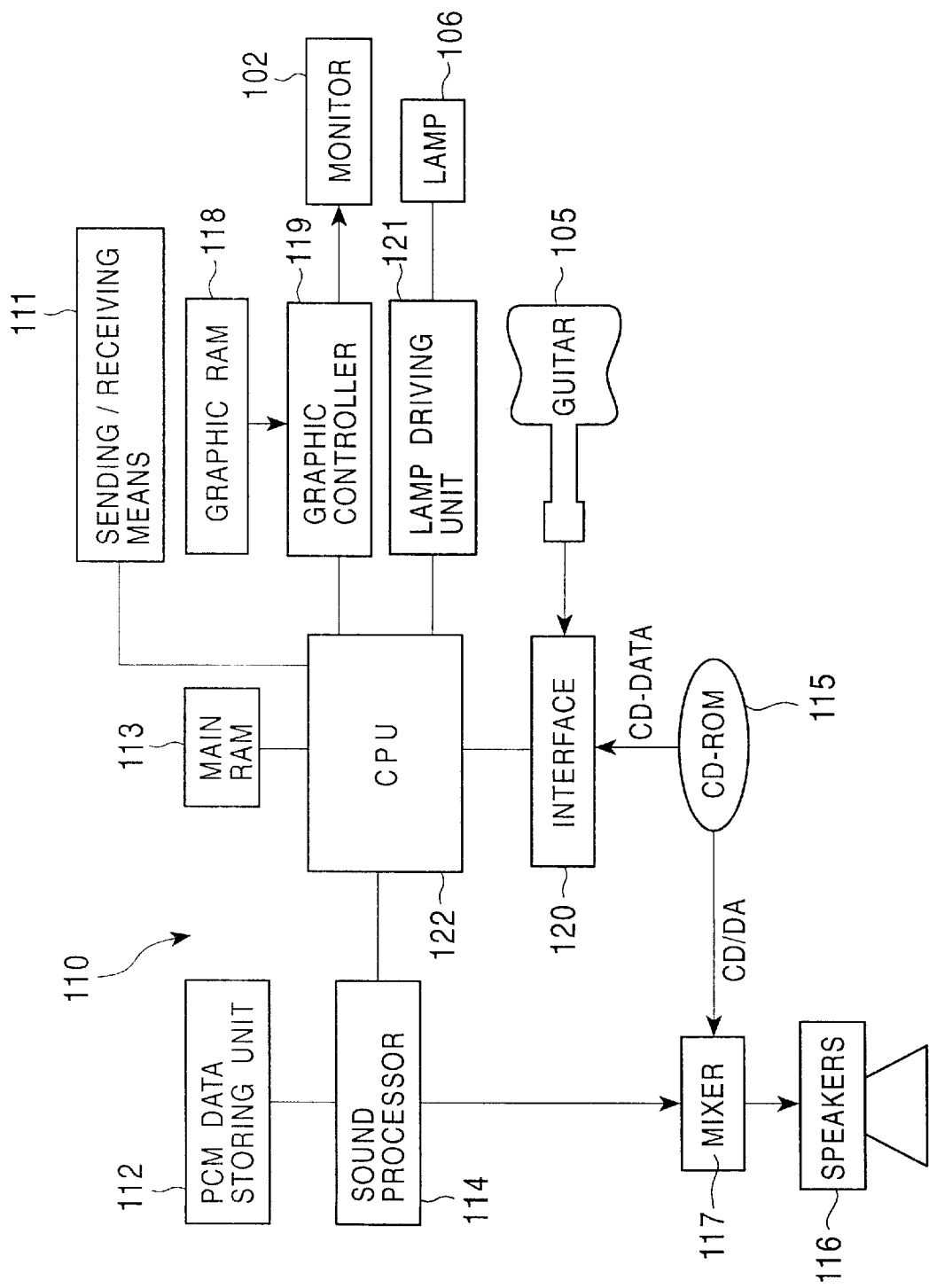
FIG. 26 is a block diagram illustrating the hardware configuration of the guitar rhythm game apparatus shown in FIG. 1.

FIG. 26 is a block diagram illustrating an example of the hardware configuration of the guitar rhythm game apparatus 3 shown in FIG. 1. In FIG. 26, the hardware configuration of the guitar rhythm game apparatus 3 has a PCM data storage unit 112, a main RAM 113 capable of reading and writing various types of data, a sound processor 114 connected to the PCM data storage unit 112 for extracting later-described sound emitting data recorded note by note from the PCM data storage unit 112 and performing sound emitting control, a mixing device 117 connected to the sound processor 114 for mixing the later-described sound emitting data from the sound processor 114 and BGM data from a CD-ROM 115 for output to a speaker 116 serving as sound emitting means, graphic RAM 118 serving as graphic storage means serving as rhythm sound storing means storing image data for the monitor 102, a graphic controller 119 connected to the monitor 102 for extracting the image data within the graphic RAM 118 and performing display control to the monitor 102, an interface 120 for receiving input signals from the mimic guitars 105 and CD-ROM 115, a lamp driving unit 121 connected to the halogen lamps 106 for driving the lighting of the halogen lamps 106, and a CPU (Central Processing Unit) 122 for controlling each portion, and sending/receiving means 111 connected to the CPU 122 and capable of sending or receiving later-described sector Nos. of the BGM data from the CD-ROM 115, by means of the CPU 122. Incidentally, describing the relation between FIGS. 1 and 26, the CD-ROM 115 comprises the music piece storing unit 31, the interface 120 and the CPU 122 comprise the reading unit 32, the CPU 122 and sending/receiving means 111 comprise the communication unit 33, the monitor 102 comprises the display unit 34, the CPU 122 and the graphic RAM 118 and graphic controller 119 comprise the display control unit 35, the mimic guitars 105 comprise the staging operating unit 36, the speakers 116 and mixing unit 117 comprise the audio output unit 37, and the CPU 122 and main RAM 113 comprise the evaluating unit 38 and master-slave control unit (not shown).

The PCM data storage unit 112 stores each sound of time-series sound emitting data (type of sound data; type selected with buttons R, G, B) of a played BGM music piece. Such a played BGM music piece for multiple music pieces for each play level is stored in the PCM data storage unit 112. This time-series sound emitting data consists of sector No., sound No. (serial Nos. provided to each of a series of sounds arrayed in a time system for each played music piece), sound emitting length, and information indicating the type of neck button (R, G, B). Also, as shown in the notes display 131 shown in FIG. 29, the graphic RAM 118 divides the rhythm sounds (notes bar 34 corresponding to the rhythm sounds) of a played music piece comprised containing at least rhythm sounds into certain intervals (which may be different for each sound, or may be the same) in the time direction C, and also stores as sound data each of a series of rhythm sounds constructed by appropriating to a series of rhythm sounds of the three types (R, G, B) on the same time axis.

Also, the CD-ROM 15 serving as the storage medium is comprised of a so-called ROM cassette wherein a plastic case houses ROM and the like storing the BGM data for played music pieces, and further storing the selection sound emitting data (type of button) for each sound of the played music piece and the output timing data (sound No.) thereof, and storing score data according the degree of matching of these, and storing program data such as control programs for the rhythm game, operating system, and so forth. The recording medium may be comprised of an optical disk or a flexible disk or the like, instead of the CD-ROM 15.

Further, the graphic RAM 118 stores screens (FIGS. 27 through 33) according to the later-described game conditions and data related thereof, such as notes screen data for rhythm input operation for visually guiding the rhythm input operation with the mimic guitar 105.

The CPU 122 causes an unshown reading device to read the program data and data related thereto (score data, selected emission sound data, output timing data, etc.) within the CD-ROM 115 from the CD-ROM 115, to be written to the main RAM 113.

Also, the CPU 122 controls the graphic controller 119 according to the processing state of the stage selection, based on the control program, and extracts necessary image data from the graphic RAM 118 and displays this on the monitor 102, while performing game stage selection processing by operation with the neck buttons R, G, B on the mimic guitar 105 and the start button 103. This stage selection processing includes selection of one player to play or two players to play, selection of difficulty, and selection of played music piece.

Figure 27:
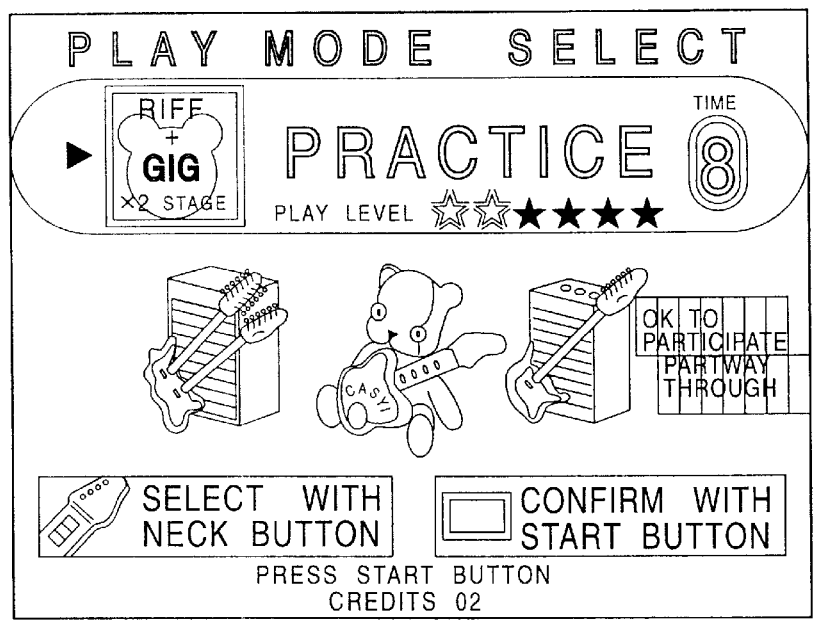
FIG. 27 is a difficulty selecting screen for the guitar rhythm game apparatus shown in FIG. 1.

For example, in the event of selecting two players to play, this is selected by depositing a certain monetary amount from both left and right coin deposit openings 4 of the rhythm game device 1, and the CPU 122 controls the graphic controller 119 to display a display screen on the monitor 102 such as shown in FIG. 27 ("credits 02" indicating two players to play), using the data within the graphic RAM 118.

Selection of difficulty involves a difficulty selection screen (guidance "select with neck button", "confirm with start button") on the monitor 102 such as shown in FIG. 27, the player sequentially selecting from the three stages of play level of advanced (expert), medium (normal), and beginner (practice) with the neck button R or the neck button G, and the CPU 122 controlling the graphic controller 119 according to the level of difficulty selected thereby to control display on the monitor 102 such that the title and number of shining stars change. For example, in FIG. 27, a screen of a bear holding a mimic guitar 105 is displayed on the monitor 102 with the title "PRACTICE" of the beginner stage and two of the six stars shining, from which pressing the neck button R once changes the screen displayed to that wherein a bear holding a different mimic guitar with the title "NORMAL" of the medium stage comes up and four of the six stars are shining, and further, pressing the neck button R once more changes the screen displayed on the monitor 102 to that wherein a bear holding another different mimic guitar with the title "EXPERT" of the advanced stage comes up and six of the stars are shining, and moreover, pressing the neck button R once more returns to the beginner "PRACTICE" screen. Incidentally, the arrangement is such that each time the neck button B is pressed, the play level changes in reverse from advanced to medium to beginner. Pressing the start button 103 according to the operation guidance "confirm with start button" determines the play level displayed on the monitor 102.

Figure 28:
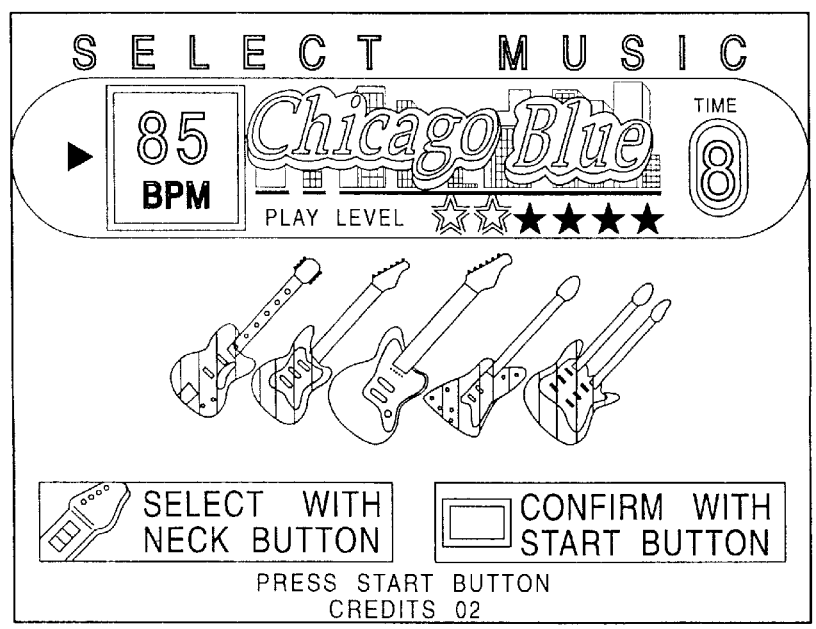
FIG. 28 is a music piece selecting screen for the guitar rhythm game apparatus shown in FIG. 1.

Further, for selecting the played music piece, a plurality of (five in the present embodiment) mimic guitars with shapes according to the played music piece are displayed on the monitor 102 as shown in FIG. 28, and the title of a played music piece corresponding to the mimic guitar at the center (the center guitar is shining, and the other guitars are not shining, as represented by the hatching) is displayed on the monitor 102. From this display state, each time the neck button R is pressed, the five mimic guitars sequentially move to the right, with the mimic guitar situated at the far right moving to the far left, and the title of a played music piece corresponding to the mimic guitar at the center is displayed. Also, the arrangement is such that each time the neck button B is pressed, the five mimic guitars sequentially move in the opposite direction (to the left) as that with the neck button R. The title of the played music piece "Chicago Blue" is displayed at the title portion of the screen of the monitor 102 shown in FIG. 28, indicating the state that the same has been selected. In the event that this selected piece is suitable, the start button 103 is pressed according to the operation guidance "confirm with start button" on the monitor 102, thereby confirming the played music piece.

Also, the CPU 122 has a judging means for judging whether or not the sound data selected with the neck buttons (auxiliary operating member) R, G, B, is instructed as operating timing within the certain interval according to the sound emitting output control procedures of the control program; a sound output control means for extracting one piece of sound emitting data from the played music piece from the PCM data storage unit 112 with the sound processor 114 according to the type of neck button R, G, B from the mimic guitar 105 and the output timing (sound No.) thereof, in a state affirmed by the judging means at least, this one piece of sound emitting data being output to the mixing unit 117 where the one piece of sound emitting data and BGM data from the CD-ROM 115 are mixed and sound emitting output from the speaker 116 is performed; and a display control means for updating notes screen data according to the time-system flow of the played music piece according to the notes display control procedures of the control program, and also performing display control on the monitor 102 of whether or not there has been a miss in the input operation with the mimic guitar 105; and rhythm input operating evaluation means for following the rhythm input operating evaluating procedures of the control program to compare the selection operation of the mimic guitar 105 and output timing operation thereof with the selection sound emitting data of the played music piece and the output timing data thereof, and perform evaluation of rhythm input operation for the score data according to the degree of matching, whereby points are added to the score.

Figure 29:
FIG. 29 is a game screen for one player playing the guitar rhythm game apparatus shown in FIG. 1.
Figure 30:
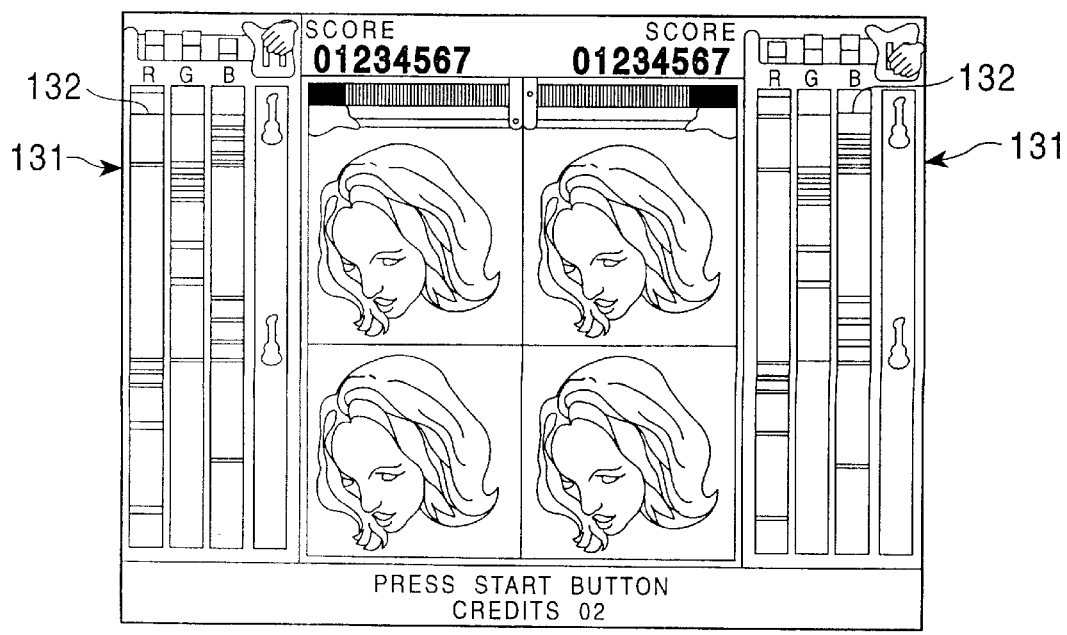
FIG. 30 is a game screen for two players playing the guitar rhythm game apparatus shown in FIG. 1.

Detailed description will now be made regarding these, the sound output control processing and the display control processing. The CPU 122 via the interface 120 obtains the next CD sector No. for the played music piece from the CD-ROM 115, and controls the graphic controller 119 based on the obtained CD sector No. such that image data is read from the graphic RAM 118 which is the graphic storage means to the next notes display position 131 so as to update it, thereby displaying on the monitor 102 as shown in FIGS. 29 or 30. That is to say, the sector No. for which the CD head is searching is obtained at each interruption in the program, and according to the time value of the sector No., the note display position 131 shown in FIGS. 29 or 30 is moved one step upwards, so that the player selects and operates the neck button corresponding to the R, G, B notes line which has reached the reference line 132 at the topmost position, and also picks.

In this way, the operator watches the notes display (neck button operating procedures) 131 at the left side of the monitor 102 in FIG. 29, and operates the neck button R, G, B, with the left hand along with the BGM, and also operates the picking lever 172 with the right hand to input operating signals to the CPU 122. At this time, the CPU 122 obtains the degree of matching with the time-system data in the table, at the point that there is signal input within the certain timing period.

This degree of matching is the extent to which the type of neck button (R, G, B) operated and the timing of picking match.

For example, in the event that this sound output has the sector No. obtained at the time of picking input and the sector No. of the corresponding time-system data within the certain interval, and also that the next button written to the neck button type on the same table has been pressed, the sound data corresponding to the sound No. within the same table is emitted for the sound emitting length thereof. Also, in the event that the type of neck button is correct, but the picking is made extending before or after the certain interval (a case wherein the picking is not contained within the certain interval), the operation is admitted, and comparison is made in the corresponding table before and after, and the closer is emitted as sound. The display to the monitor 102 at this time is a "fail" display (gray). Incidentally, a "success" display is lit as a color corresponding to the operated neck button R, G, B with the notes bar 34 of the notes display 131. Also, in the event that the picking input time is within the certain interval but the neck button type is wrong, a sound No. is obtained from the table with the data of the closest same type of button and emitted as sound. The display to the monitor 102 at this time also is a "fail" display (gray). In this way, the CPU 122 controls the sound processor 114 to obtain sound data from the PCM data storing means 112 for the sound selected by the player with the neck button at the timing of operating the picking lever, which is emitted via the speaker 116.

Figures 31, 32:
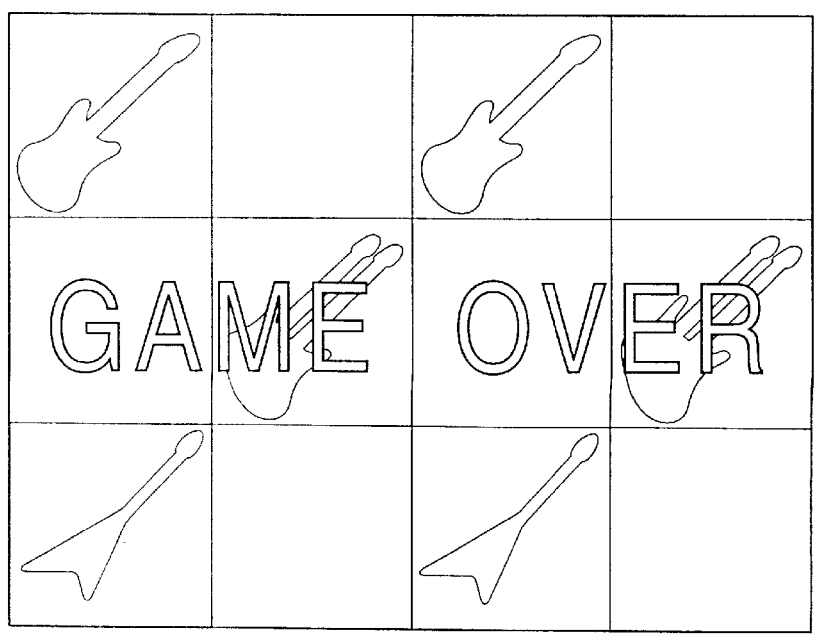
FIG. 31 is a stage results screen for the guitar rhythm game apparatus shown in FIG. 1.
FIG. 32 is a game-over screen for the guitar rhythm game apparatus shown in FIG. 1.

Next, the rhythm input operation evaluating processing will be described in detail. The CPU 122 is arranged so as to extract score points from the score point table according to various conditions such as amount of picking offset from the reference timing range, different neck button types, whether continuous input operations are correct or not, whether there is no input of operating signals which should be made within the certain timing period, and so forth, following the rhythm input operation evaluation procedures of the control program and the game data, thereby calculating the score. Also, the CPU 122 is arranged to calculate the amount of time (gauge amount) necessary till sound emitting. Based on the gauge amount calculation results and the score calculation results, the calculated score points are added to the accumulated score points and updated and stored to the main RAM 113, and at the same time the calculated gauge amount is subtracted from the remaining life amount and the remaining life amount is updated and recorded, so that the remaining life amount is displayed on the monitor 102 as a horizontal bar graph 133. In the even that there is no updated remaining life amount, the CPU 122 displays a "Game Over" display such as shown in FIG. 32 on the monitor 102, and the rhythm game is ended.

Figure 34:
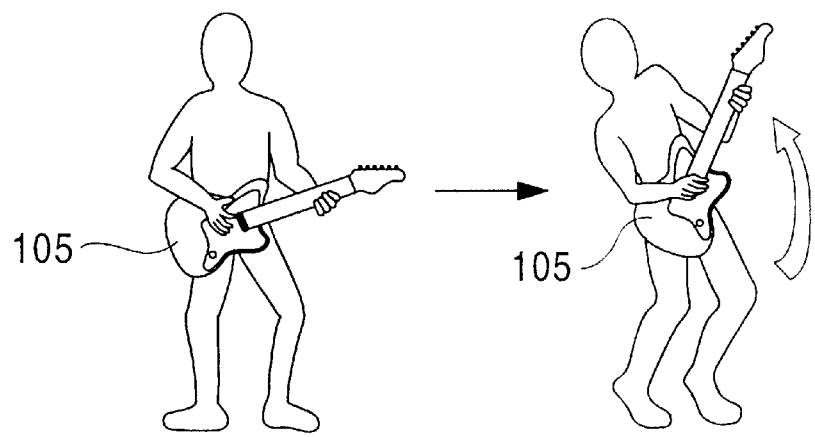
FIG. 34 is a model diagram illustrating the state of tower picking.
Figure 35:
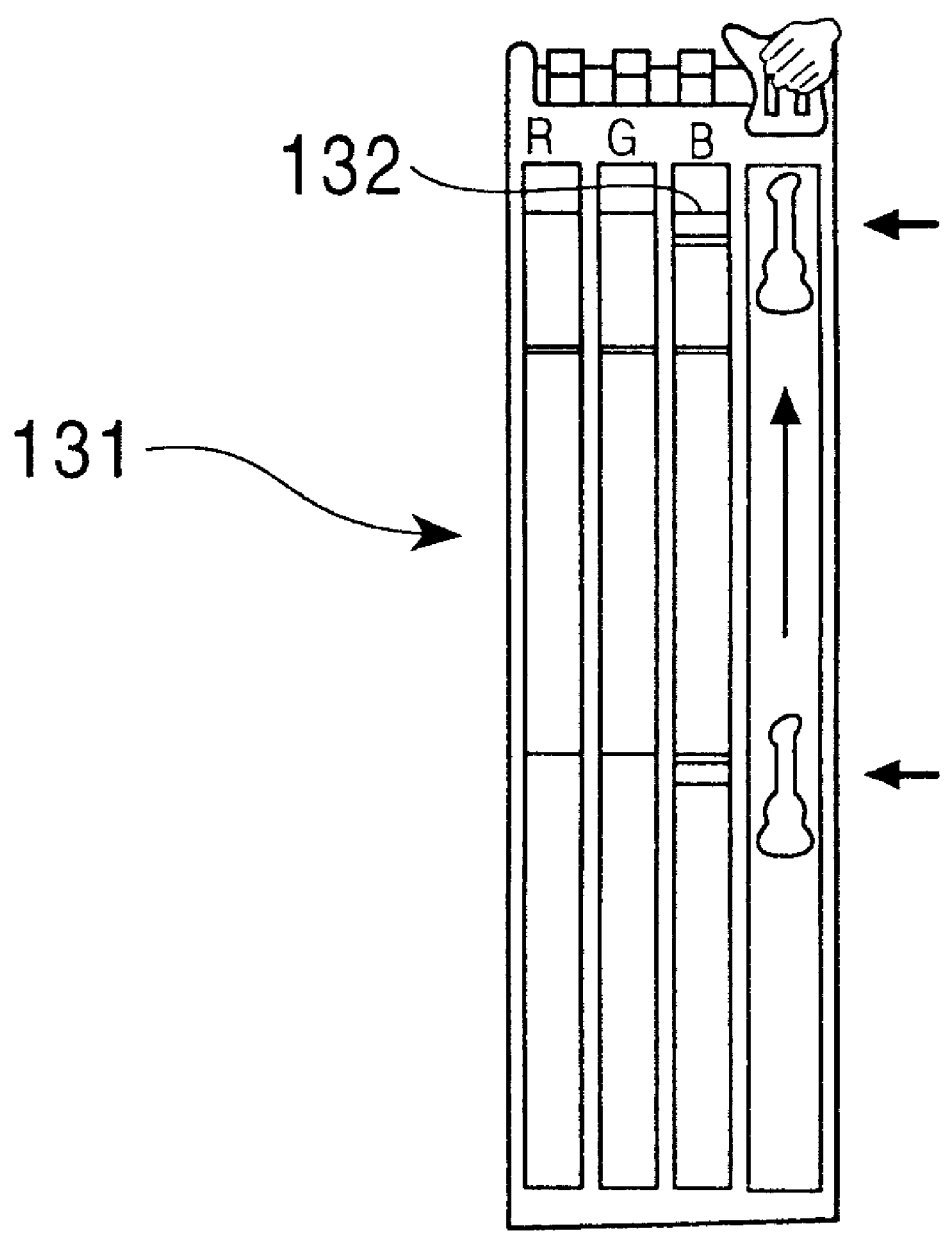
FIG. 35 is a notes display diagram for guiding the timing for tower picking.

Further, tower picking of the mimic guitar 105 will be described. An over-turn detecting unit (not shown) is set within the mimic guitar 105, so as to detect the angle of the mimic guitar 105 while playing. By adding an action of holding the mimic guitar 105 vertically at a certain point in the played music piece as shown in FIG. 34 while playing the game, the over-turn detecting unit (not shown) detects this and outputs a detection signals, whereby the CPU 122 obtains high score points from the main RAM 113, adds to the score and stores in the main RAM 113, following the tower picking evaluation procedures of the control program, and at the same time the arrangement is such that the lamp driving unit 121 is controlled to light the halogen lamps 106, thereby staging a fanatical live performance. This action is in order to encourage over-acting while playing the game, so there are no minus actions taken such as reducing the score in the event that this action is not performed. Also, regarding the detection timing for this action, since there are offsets in the action and many different operation images, a guitar mark appears to the right side of the notes display unit 131 from one frame ahead as shown in FIG. 35, this guitar mark ascends along with the flow of the played music piece, so that the timing matches if the mimic guitar 105 is raised when this reaches the position of the reference line 132.

The operation of the above configuration will be described below.

Figure 36:
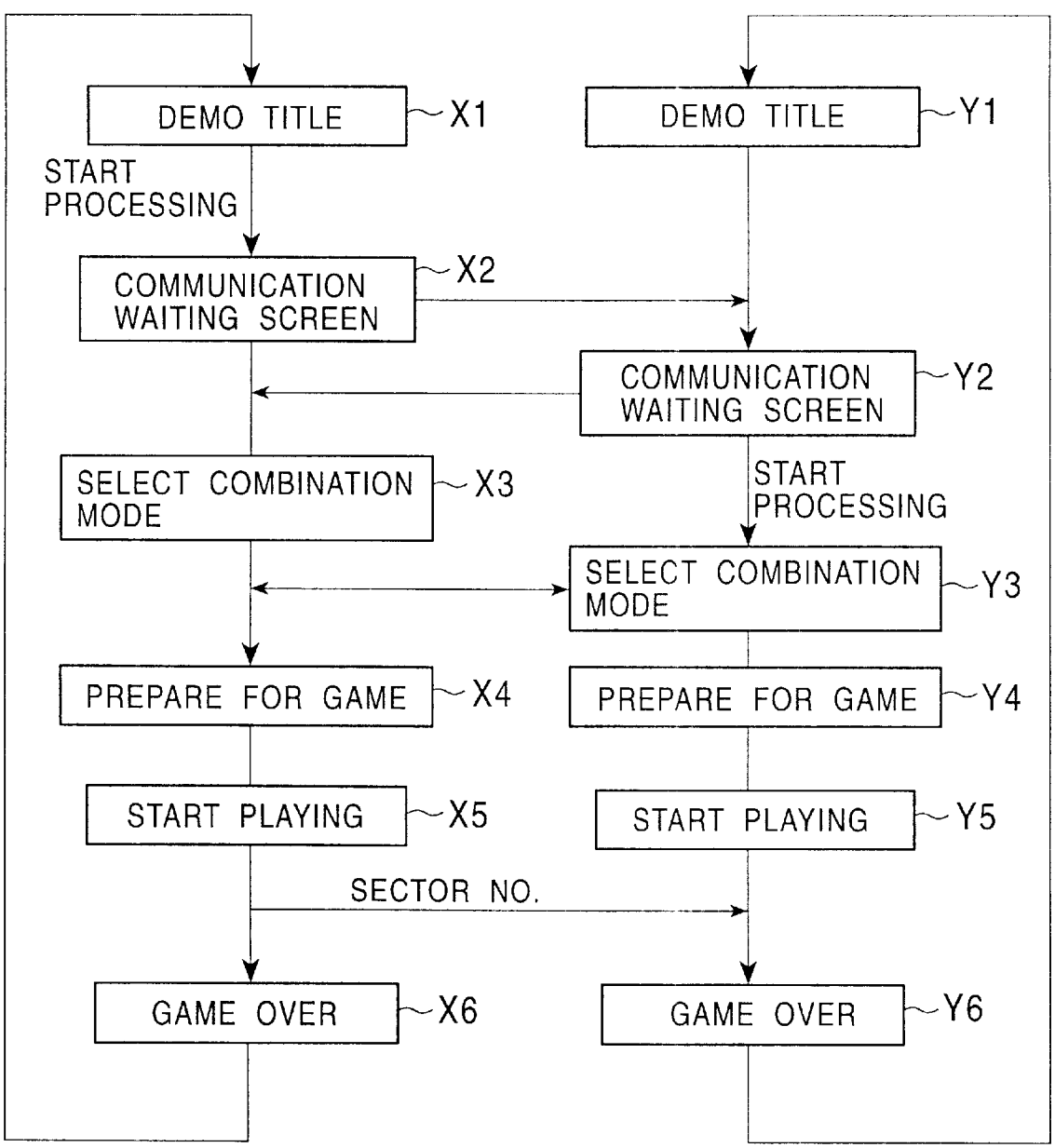
FIG. 36 is a sequence diagram illustrating the operational relation between the drum rhythm game apparatus and the guitar rhythm game apparatus of the rhythm game system shown in FIG. 1.

First, the peripheral demo will be described. As shown in FIG. 36, the demo title process X1 is performed first at the drum rhythm game apparatus 2. For example, a warning screen such as shown in FIG. 9, displaying a warning text such as age restriction or the like, is displayed on the monitor 42, an opening video is displayed, the title of this rhythm-matching game "Drum rhythm game" is displayed, and further, how to play this rhythm-matching game (operation method) is described. Also, a demo of a noted music piece is performed. Subsequently, the flow returns to the warning screen.

Also, the demo title process Y1 is performed at the guitar rhythm game apparatus 3, as with the drum rhythm game apparatus 2.

With the drum rhythm game apparatus 2, in the event that a coin of a certain monetary value is deposited from the coin deposit opening 16 (the start process) during the above routine, a communication waiting screen X2 comes up. At this time, the drum rhythm game apparatus 2 detects that a coin has been deposited first thereto, so a control signal is sent from the drum rhythm game apparatus 2 to the guitar rhythm game apparatus 3 so as to set the game apparatus side to which the coin has been deposited first as the master game apparatus (the drum rhythm game apparatus 2 in the present embodiment) and the game apparatus side to which a coin has not been deposited yet as the slave game apparatus (the guitar rhythm game apparatus 3 in the present embodiment), thereby bringing up a communication wait screen Y2 on the guitar rhythm game apparatus 3. Depositing a coin of a certain monetary value from the coin deposit opening 104 (the start process) of the guitar rhythm game apparatus 3 in this state causes a control signal to be sent from the guitar rhythm game apparatus 3 to the drum rhythm game apparatus 2, and the guitar rhythm game apparatus 3 and drum rhythm game apparatus 2 display a selection screen for selecting between the normal mode (in the case that each rhythm game apparatus is to be used for playing games independently) or the combination mode (in the case that each rhythm game apparatus is to be mutually connected by communication and a game is to be played integrally).

Further, in the event that the combination mode between the drum rhythm game apparatus 2 and the guitar rhythm game apparatus 3 (two-machine mode) is selected (X3, Y3), game preparation (X4, Y4) involving the later-described difficulty mode selection processing, stage selection processing and data loading, is performed at both the drum rhythm game apparatus 2 and the guitar rhythm game apparatus 3, following which the flow reaches "start playing" (X5, Y5), the later-described sector No. communication is performed, and the rhythm-matching game starts. Of the drum rhythm game apparatus 2 and the guitar rhythm game apparatus 3, the operation from the game preparation on will be described below for the drum rhythm game apparatus 2 first.

Figure 37:
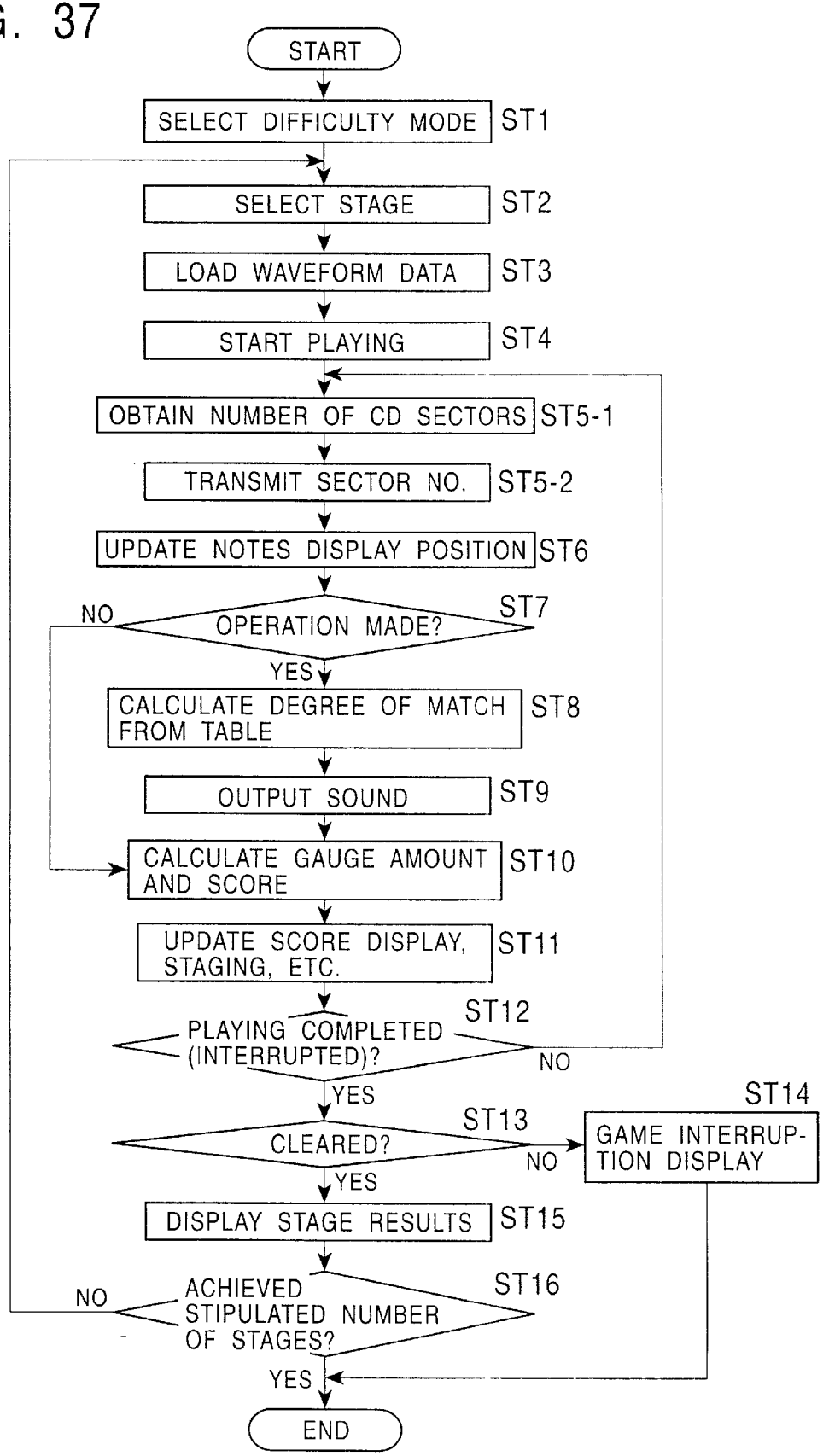
FIG. 37 is a flowchart illustrating the operation of the drum rhythm game apparatus shown in FIG. 1.

FIG. 37 is a flowchart showing the operations of the rhythm game apparatus in FIG. 1. As shown in FIG. 37, first, in step ST1, difficulty mode selection processing is performed. That is, the player pressing the selection button 54 once from the normal mode state shown in FIG. 10 selects the practice mode shown in FIG. 11, pressing the selection button 55 once from the practice mode state shown in FIG. 12 returns to the normal mode, and further pressing the selection button 55 once more selects the real mode. Further, pressing the selection button 55 once more from the real mode state selects the expert-real mode, though not shown in the drawings. In this way, pressing the confirm/start button 53 in the state with the practice mode selected selects the practice mode, pressing the confirm/start button 53 in the state with the normal mode selected selects the normal mode, pressing the confirm/start button 53 in the state with the real mode selected selects the real mode, and pressing the confirm/start button 53 in the state with the expert-real mode selected selects the expert-real mode. In order to simplify description, the following will be described with reference the case of the normal mode. Also, the practice mode will be mentioned later as a practicing mode.

Next, stage selection processing is performed in step ST2. That is, as shown in FIG. 13, selection of the played music piece is performed such that multiple notes corresponding to the difficulty of the played music piece are displayed on the monitor 42, and pressing the selection button 54 once moves the notes to the left such that the title "I THINK ABOUT YOU" for the next played music piece corresponding to the note situated at the center moves to the left side of the monitor 42 and is displayed there. Also, pressing the selection button 55 once displays the title "YOU CAN MAKE IT" for the played music piece to the left side of the monitor 42. In the state that the title of the played music piece is displayed, pressing the confirm/start button 53 finalizes the selection of the played music piece for the displayed title.

Further, data is loaded in step ST3. Control programs for instructing the procedures for the rhythm-matching game and related data, other than the BGM data, are read into the main RAM 82 via the flash ROM on the main board from the CD-ROM 84 which is the recording medium. Thus, once the preparation for playing is completed, the game screen such as shown in FIGS. 7 and 8 is displayed on the monitor 42 in step ST4. The notes display 93 indicating the operation timing instruction procedures for the striking or pedal operation for each of the mimic percussion instruments as to the selected music piece is displayed on the left side of the monitor 42. A screen corresponding with the state of the music piece according to that selected music piece is displayed on the right side of the monitor 42. Further, the amount of life remaining before the game is over is displayed at the upper right side of the monitor 42, in the form of a horizontal bar graph 96.

The notes display 93 displayed on the monitor 42 has notes bars 94 indicating the input timing of the series of rhythm sounds in a vertical array corresponding to the marks for the mimic percussion instruments sequentially come down from above, and also the player must strike or perform pedal operation of the mimic percussion instrument corresponding to the mark at the point that the notes bar 94 reaches the reference line 95 above the mimic percussion instrument mark.

Further, the CPU 91 obtains the sector No. that the CD is currently reproducing in step ST5-1, sends the obtained sector No. to the guitar rhythm game apparatus 3 with the sending/receiving means 92 in step ST5-2, and updates the position of the notes display 93 instep ST6, based on the obtained sector No. The player watches the notes display 93 (the timing instruction procedures for the striking or pedal operation of the mimic percussion instruments) to the left side of the monitor 42, and performs striking and/or pedal operation of the mimic percussion instruments with the left and right hands and/or right foot, along with the BGM. At this time, input instruction signals are output to the CPU 91, and the CPU 91 judges whether or not there has been signal input within a certain timing in step ST7.

At the point that the player has performed striking or pedal operation in step ST7, the extent of matching (degree of matching) between the type of mimic percussion instrument to which the striking or pedal operation was performed in step ST8 and the input detection timing thereof, and the time-sequence data in the table (the type of mimic percussion instrument for the rhythm sound in the played music piece, and the input timing thereof) is obtained, and in step ST9, at the input detection timing to the mimic percussion instrument, the CPU 91 controls the sound processor 83 to obtain rhythm sound data corresponding to the mimic percussion instrument in the played music piece from the PCM data, and mixes that rhythm sound data with the BGM data from the CD-ROM 84 and the mixing unit 85, and emits sound from the speakers 43 and 44.

Further, in step ST10, the remaining life amount (gauge amount) calculation for how longer the game can be played, and score calculation is performed. That is, scores are extracted from the score table in step ST10 and calculated according to conditions such as the amount of offset from the reference timing range for the input detection timing of the striking or pedal operation to the mimic percussion instruments as described above (the level of degree of matching), mistakes in the type of mimic percussion instrument, cases wherein continuous striking or pedal operation is correct, cases wherein input of input instruction signals from striking or pedal operation which should have existed within a certain timing period in step ST7 but did not, and so forth; and further, the time necessary for the striking or pedal operation input is calculated.

Further, the gauge, score, and staging is updated in step ST11, based on the gauge amount calculations and score calculation results in step ST10. That is, the score calculated in step ST10 is added to the accumulated score and updated and stored in the main RAM 82. Also, the gauge amount calculated in step ST10 is subtracted from the remaining life amount to update and record the remaining life amount, and the remaining life amount is displayed as the horizontal bar graph on the monitor 42 as represented by reference numeral 96 in FIGS. 7 and 8.

Further, in step ST12, judgement is made whether or not playing of the selected music piece has ended is made by detecting the presence or absence of an ending code attached at the end of the PCM data of the selected music piece obtained by the CPU 91 via the sound processor 83, and in the event that the playing of the selected music piece has not ended, the flow returns to step ST5.

Also, in the event that step ST12 yields YES (the playing of the selected music piece has ended), judgement is made in step ST13 whether or not selected music piece has been cleared, and in the event that the selected music piece has not been cleared, a game interruption display is made on the monitor 42 in step ST14, and the game is ended. Also, in step ST13, in the event that the selected music piece has been cleared, in step ST15 a grades display screen including total scores as evaluation of the playing based on the sore calculation results such as shown in FIG. 16 for example, overall evaluation (e.g., displayed by alphabet letters A through E, etc.) and the like, is displayed on the monitor 42, thereby notifying the player of the stage results.

Further, in step ST16, judgement is made by the CPU 91 regarding whether or not a stipulated number of stages (e.g., up to three selected pieces can be selected) has been achieved, along with whether or not there is any remaining life amount updated, and in the event that the stipulated number of stages has been achieved or there is no remaining life amount the game ends, and in the event that the stipulated number of stages has not been achieved or there is yet remaining life amount, the flow returns to step ST2 and performs the series of processing for the next sound (step ST3 through ST15) and this is repeated until the stipulated number of stages has been completed or there is no life amount remaining.

Subsequently, in step ST16, in the event that the CPU 91 detects the ending code attached to the end of the PCM data of the selected music piece (the stipulated number of stages has been achieved), judgement is made that the playing of the selected music piece has ended, so the CPU 91 controls the graphic controller 87 to make a game-over display on the monitor 42, to end the game (game over X6 in FIG. 36).

Figure 38:
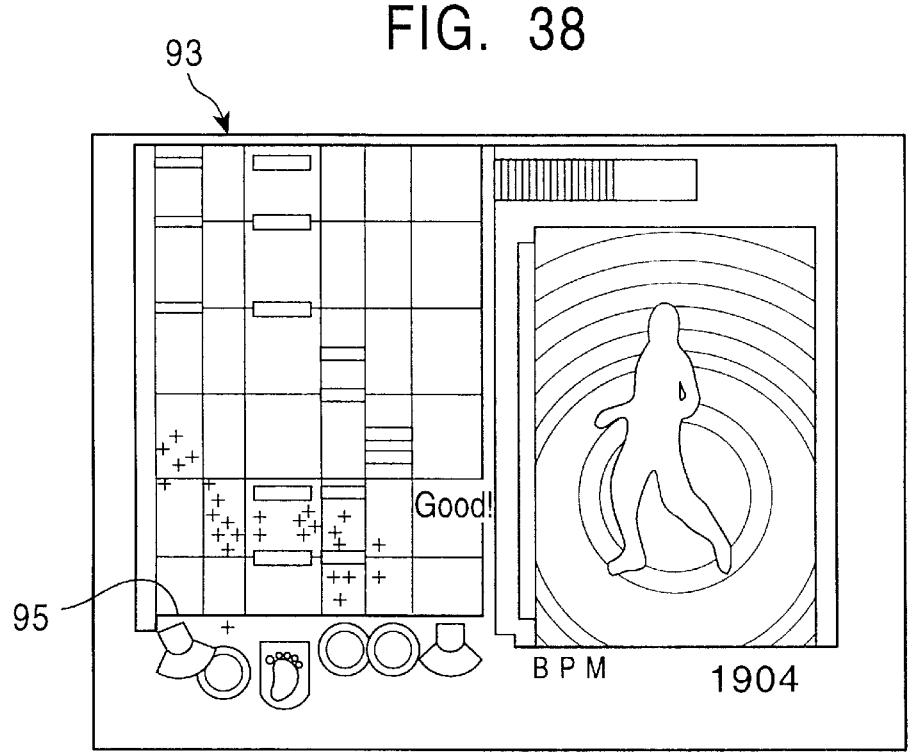
FIG. 38 is a diagram illustrating yet another example of the game screen displayed on the monitor shown in FIG. 6.
Figure 39:
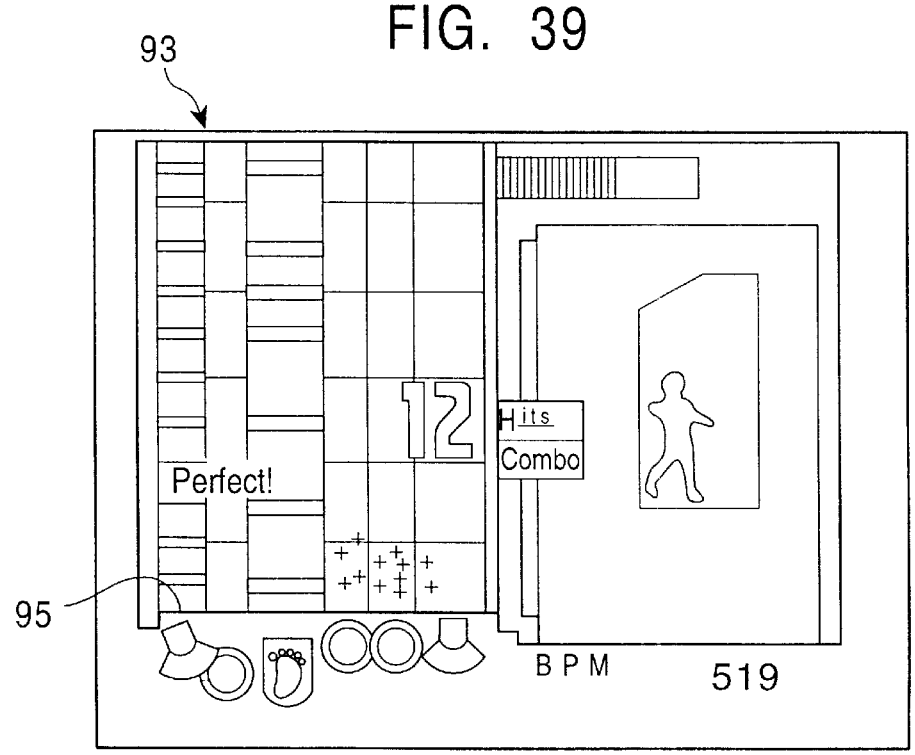
FIG. 39 is a diagram illustrating still another example of the game screen displayed on the monitor shown in FIG. 6.

Next, the operation of the practicing mode (practice mode) will be described. In the event that the practice mode is set, first, a teacher for performing a model performance appears on the monitor 42 and plays a certain practice piece, which the player listens to and learns the sense of input timing for the striking or pedal operation. Next, a game screen such as shown in FIGS. 38 and 39 for example is displayed on the screen of the monitor 42, and the input timing for the striking or pedal operation to the mimic percussion instruments for that practice piece are displayed and instructed on the position of the notes display 93, along with which the striking or pedal operation is performed, whereby sound is emitted according to the type of mimic percussion instrument and the input detection timing. In the event that the type of mimic percussion instrument and the operation timing made by the player matches the playing of the teacher, the notes bars 94 on the notes display 93 are displayed as instruction for the series of rhythm sounds, separately for each type of mimic percussion instrument, and the evaluation of the rhythm-matching game is judged by whether or not it matches the displayed timing, as with the above-described normal mode.

Next, the operation of the guitar rhythm game apparatus 3 will be described below.

Figure 40:
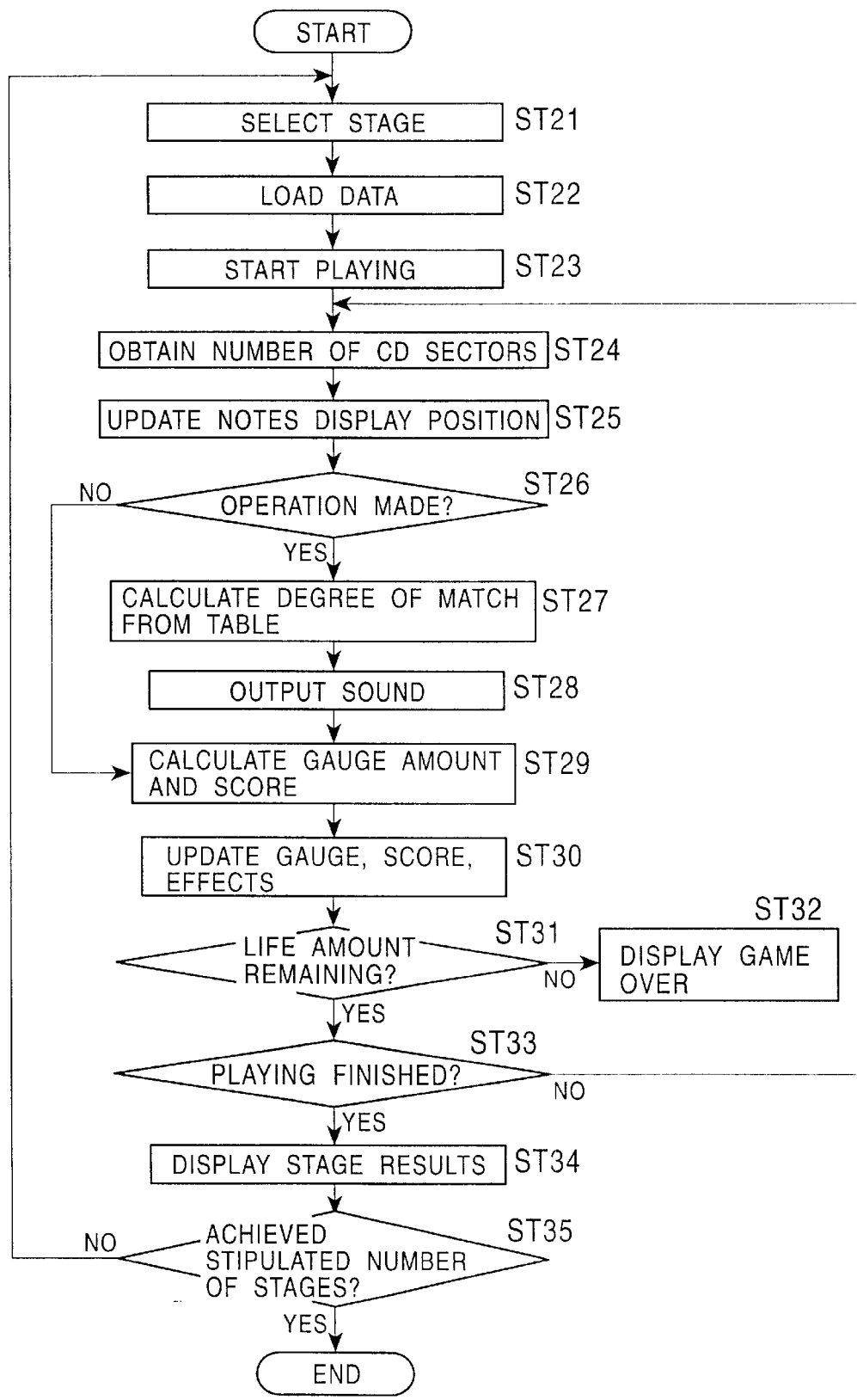
FIG. 40 is a flowchart illustrating the operation of the guitar rhythm game apparatus shown in FIG. 1.

FIG. 40 is a flowchart illustrating the operation of the guitar rhythm game apparatus 3 shown in FIG. 1. As shown in FIG. 40, first, in step ST21, stage selection is made from the various stages. That is, whether one is to play or two is to play is selected by depositing a certain monetary amount in both coin deposit openings 104 on the left and right side of the guitar rhythm game apparatus 3, or by depositing in only one. An initial display screen such as shown in FIG. 12 is displayed on the monitor 102, and a display such as "credits 02" is made in the event that two are to play. Also, coins for two have been deposited by only one person has taken a mimic guitar 105, so the display screen displays a comment such as "OK to participate partway through" shown in FIG. 27 is displayed in order to urge another to play.

Also, this display screen is a difficulty display screen, where selection is sequentially made from the three stages of play level of advanced (expert), medium (normal), and beginner (practice) with the neck button R or G, following the difficulty selection guidance "select with neck button", and for example, the beginner title "PRACTICE" with two of the six stars shining as shown in FIG. 27 is selected. Next, the start button 103 is pressed following the operation guidance of "confirm with start button" on the monitor 102, confirming the beginner level for the play level.

Further, selection of the played music piece is performed by five mimic guitars having shapes corresponding to the played music piece being displayed on the monitor 102 as shown in FIG. 28, and the played music piece being selected by pressing the neck button R. In FIG. 28, the title of the played music piece "Chicago Blue" corresponding to the mimic guitar at the center is displayed. In the event that this is suitable, the start button 103 is pressed following the operating guidance "confirm with start button" on the display screen, thereby confirming the played music piece.

Next, data loading is performed in step ST22. Control programs instructing the procedures of the rhythm-matching game and related data other than BGM data is read into the main RAM 113 from the recording medium CD-ROM 115. Thus, when preparations for playing are completed, the game screen is displayed on the monitor 102 in step ST23. FIG. 29 illustrates the game screen for a single player, and FIG. 30 illustrates the game screen for two players. Here, the screen for a single player will be described, in order to facilitate ease of description. A notes display 131 is carried out to the left side of the monitor 102, showing the neck button operating procedures for the selected music piece, displayed with different colors for each of the neck buttons R, G, and B, and the playing of the selected piece thus starts.

Further, in step ST24 the CPU 122 receives the CD sector No. being sent from the transmitting/receiving means 92 of the drum rhythm game apparatus 2 with the transmitting/receiving means 111 so as to obtain the same, and in step ST25 updates the position of the notes display 131 based on the CD sector No. The player watches the notes display 131 (neck button operating procedures) at the left side of the monitor 102, and operates at least one of the neck buttons R, G, and B with the left hand, and also operates the picking lever 172 with the right hand, along with the BGM, thereby outputting operating instructing signals to the CPU 122. At this time, the CPU 122 judges whether or not there has been signal input within the certain timing period in step ST26.

At the point that there has been operating input by picking performed by the player in step ST26, in step ST27 the degree of matching of the type of operated neck buttons R, G, and B and the picking timing with the time-system data (the type of buttons and output timing of the played music piece) in the table is obtained, and in step ST28, the CPU 122 controls the sound processor 114 to obtain sound data for the played music piece from the PCM data, for the type of button selected with at least one of the neck buttons R, G, and B at the timing that the picking lever 172 was operated, which is emitted via the speaker 116.

Further, in step ST29, calculation of the remaining life amount (gauge amount) wherein the game can be played, and calculation of the score is performed. Score points are extracted form the score point table according to conditions such as amount of picking offset from the reference timing range, wrong neck button types, correct continuous input operations, cases wherein there is no input of operating instructing signals which should be made within the certain timing period in step ST26, such as described above, and the score is calculated. Also, the amount of time necessary for the operating input is calculated.

Further, based on the gauge amount calculation and score calculation results in step ST29, the gauge, score, and staged effects are updated in step ST30. The score points calculated instep ST29 are added to the accumulated score points and updated and stored in the main RAM 113. Also, the gauge amount calculated in step ST29 is subtracted from the remaining life amount and the remaining life amount is updated and recorded, and the remaining life amount is displayed on the monitor 102 as a horizontal bar graph, as shown by reference numeral 133 in FIG. 29.

Further, in step ST31, the CPU 122 judges whether or not there is updated remaining life amount, and in the event that there is no remaining life amount a "Game Over" display such as shown in FIG. 32 is displayed on the screen on the monitor 102 in step ST32, and the game is ended (game-over Y6 in FIG. 36).

Further, in step ST33, judgement is made whether or not playing of the selected piece has ended, by detecting whether or not there is an ending symbol which has been added to the end of the PCM data of the selected piece which the CPU 122 has obtained via the sound processor 114. In step ST33, in the event that the CPU 122 judges that the playing of the selected music piece has not ended, the flow returns to step ST23, performs the series of processing for the next sound (steps ST23 through ST33), which is repeated until the playing of the selected music piece ends.

In the event that the CPU 122 detects the ending symbol which has been added to the end of the PCM data of the selected piece and thus judges in step ST33 that playing of the selected piece has ended, in step ST34 the CPU 122 controls the graphic controller 119 to display a stage results display such as shown in FIG. 31 on the monitor 2 as an evaluation of the playing, based on the score calculation results.

Subsequently, in step ST35, the CPU 122 judges whether or not the stipulated number of stages (e.g., up to three selected pieces can be selected) has been achieved, and end the game (game over Y6 in FIG. 36) in the event that this has been achieved, and returns to step ST21 to repeat the above series of actions in the event that this has not been achieved.

Figure 33:
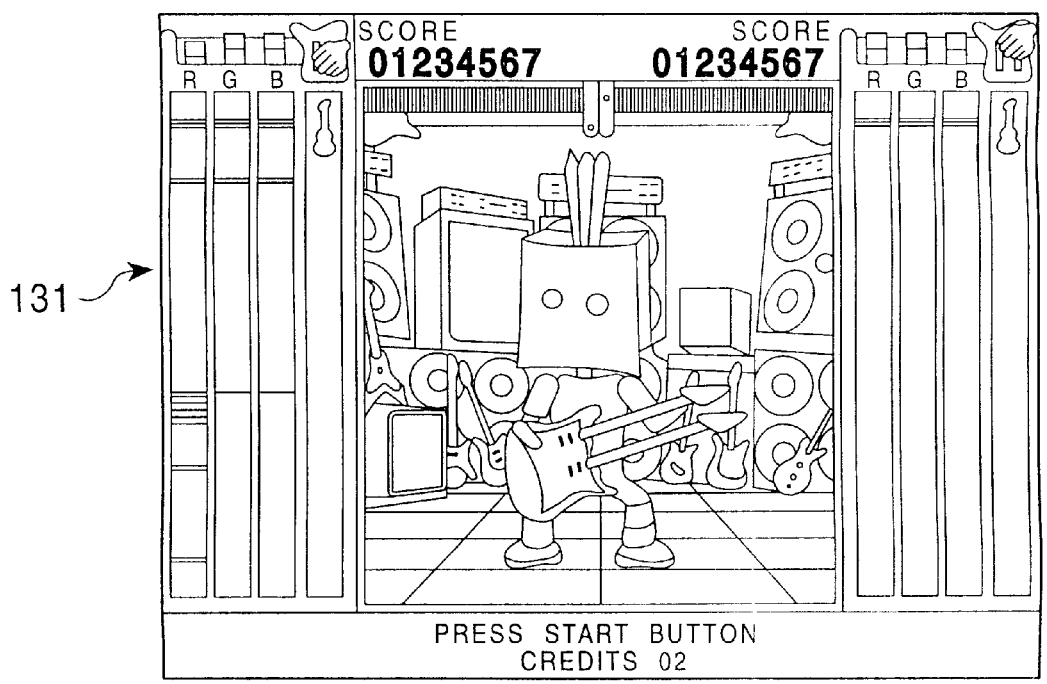
FIG. 33 is a practice riff stage screen for the guitar rhythm game apparatus shown in FIG. 1.

Further, the operation of the riff mode for practice will be described. When the setting for the riff mode is made, first, a teacher for performing a model performance appears on the monitor 102 and plays a certain practice piece, which the player listens to and learns the sense of the operation timing. Next, a monitor screen such as shown in FIG. 33 is displayed, and the neck button operating procedures for that practice piece are displayed on the position of the notes display 131, along with which at least one type from the neck buttons R, G, B and picking is performed, whereby sound is emitted according to the type of neck button and picking timing. In the event that the type of neck button and picking timing of the player match that of the teacher, the notes bar 134 of the notes display 131 is displayed with the colors R, G, and B, corresponding with the types of neck buttons, and in the event that this does not match, the RGB colors disappear and become gray, thereby allowing judgement whether or not this has matched.

As described above, according to the present embodiment, transmitting the sector No. of the playing progression information between the drum rhythm game apparatus 2 and the guitar rhythm game apparatus 3 allows visual staging instructions to the players regarding the BGM played music piece to be synchronized at both the drum rhythm game apparatus 2 and the guitar rhythm game apparatus 3, while staging operations can be made from the staging operating units of each, thereby allowing the game to be played in a state closer to reality where multiple players each have different instrument parts, such as with an actual band, making the game even more enjoyable.

Also, the playing information of the BGM music piece being played is output only from one or other of the drum rhythm game apparatus 2 and the guitar rhythm game apparatus 3, so there is no minute offset of the BGM music piece being played in the event of output from both the drum rhythm game apparatus 2 and the guitar rhythm game apparatus 3.

Further, the slave-master relation is decided between the first and second music staging game apparatuses by detecting the intent to start a game, such as by to which a coin was deposited first, and information is transmitted from the master game apparatus to the slave game apparatus, so synchronizing can be easily realized by using the playing progression (sector No.) of one or other of the drum rhythm game apparatus 2 and the guitar rhythm game apparatus 3 as reference for the other.

Further, sector Nos. of the writing position information of the played BGM music piece can be used to easily and accurately synchronize the visual staging instructions to the players regarding the BGM music piece being played between the drum rhythm game apparatus 2 and the guitar rhythm game apparatus 3.

Further, delay in the playing progression information due to communication is resolved, so even more suitable synchronization can be achieved between the drum rhythm game apparatus 2 and the guitar rhythm game apparatus 3.

Further, different types of staging operating units such as with the drum rhythm game apparatus 2 and the guitar rhythm game apparatus 3 can be used, allowing a wide variety of ways of staging to be performed for the played music piece.

Next, with the drum rhythm game apparatus 2 according to the present embodiment, the CPU 91 controls the graphic controller 87 based on the control program within the main RAM 82 to extract a series of rhythm sound data for each of the multiple mimic percussion instruments each from the graphic RAM 86 and display these in a related manner in the time-axial direction on the monitor 42, perform display instruction for input timing regarding the sounds of the multiple mimic percussion instruments on the monitor 42, sequential striking input of rhythm sounds is performed by the player with the left and right hands for example via the rhythm input detecting means 88 corresponding to the multiple mimic percussion instruments, while confirming the input timing display instructions, and the timing thereof is compared with the display instruction timing and evaluation is made from the offset amount, and the evaluation results are accumulated, so a rhythm-matching game with a higher gaming nature can be realized, and also, even though percussion instrument playing is performed in a state closer to reality using at least the right hand and left hand, and further the foot, for rhythm sound input, the rhythm-matching game does not become complex, and can be carried out relatively easily.

Also, the rhythm input detecting means can be easily configured by attaching shock sensors 63 to mimic percussion instruments. Also, in the event that the shock sensors 63 detect not on/off but detect analog striking amounts, the sound data can have touch intensity, which gives a greater variety of sounds emitted by sound emission instruction, and the gaming nature of the rhythm-matching can be carried out at an even higher level.

Further, drum pads 47 through 49 are used for drums, drum pads 50 and 51 for cymbals, and the foot pedal 52 for the bass drum, etc.,i.e., multiple mimic percussion instruments are used, so the rhythm-matching game can be carried out using right and left hands and further the feet, in a state closer to reality.

Further, the display array of each series of rhythm sounds in the notes display 93 on the monitor 42 matches the array of the multiple mimic percussion instruments, and marks represent the mimic percussion instrument corresponding to the display area for each series of rhythm sounds, so the display array for guiding the striking or pedal operation of the multiple mimic percussion instruments along the time-system is extremely readily viewed.

Further, the various display forms are changed at the input timing in the notes display 93 on the monitor 42, so whether the input timing is good or bad is clearly understood in real-time, so the player can perform the game at a high level.

Further, sound emission output control and rhythm input evaluation is performed according to the sound selection contents (type of the mimic percussion instrument) and the input detection timing thereof, so evaluation can be made accurately on an evaluation standard, so in the event that two take turns to play, the two can compete regarding the evaluation standard, and the rhythm-matching game can be enjoyed in a fair and objective manner.

Further, sound emission instruction is performed with the notes display 93 as a guide, so even a relatively complex played music piece can be easily played in the rhythm-matching game. Also, misses in input are displayed on the notes display 93 in real-time, so the player can identify and immediately correct his/her mistake in real-time, thereby allowing the rhythm-matching game to be enjoyed at an even higher level.

Next, with the guitar rhythm game apparatus 3 according to the present embodiment, sound emitting output control and rhythm input operation evaluation is performed according to the sound selection contents (type of buttons R, G, B) with the left hand of the mimic guitar 105 and the output timing with the right hand, so a rhythm-matching game can be enjoyed relatively easily in a manner closer to a realistic state of playing an instrument, fully using the right hand and left hand.

Also, when conducting this guitar rhythm-matching game, the always-changing sound selection contents and the output timing thereof are displayed on the monitor 102, so the rhythm-matching game can be performed in an easier and more sure manner, such that rhythm-matching becomes easier for even relatively difficult pieces, so the game becomes even more enjoyable.

Further, the guitar rhythm game apparatus 3 is an arrangement applied to playing with a mimic guitar 105, and the player can perform the rhythm-matching game in a manner closer to a realistic state using the right hand and left hand.

Further, according to the picking input means 107, a simpler configuration can be used to obtain a realistic feel close to that of picking a mimic guitar 105, and more precise output timing can be achieved.

Further, performing sound emitting output based on the degree of matching of the sound selection and output timing allows sound emitting output according to the played music piece to be made in a more natural manner.

Further, the way of holding the rhythm input operating means can be changed with the sensation of a live performance, such that in the case of a mimic guitar 105, the action of raising along with the music allows the rhythm-matching game to be enjoyed in a more fanatical manner.

Incidentally, the present invention is not restricted to the above embodiment; rather, the following variations may be employed also.

(1) Though the present embodiment involved a drum rhythm game apparatus 2 and a guitar rhythm game apparatus 3 being connected online, such as with a transfer cable 4, the drum rhythm game apparatus 2 and the guitar rhythm game apparatus 3 may be connected in a wireless manner, using airwaves, sound waves, light, or the like.

(2) Though the present embodiment involved the BGM music piece played being output from either one of the drum rhythm game apparatus 2 and the guitar rhythm game apparatus 3, the present invention is not restricted to such an arrangement; rather, the BGM music piece played may be output from both the drum rhythm game apparatus 2 and the guitar rhythm game apparatus 3, in which case sending the played BGM music piece from the drum rhythm game apparatus 2 to the guitar rhythm game apparatus 3 along with the sector Nos. allows minute offsets in the played BGM music piece that occur when output from each of the drum rhythm game apparatus 2 and the guitar rhythm game apparatus 3 to be suppressed. Also, an arrangement wherein the BGM music piece to be played is read out of the CD-ROM 115 of the guitar rhythm game apparatus 3 based on sector Nos. received by the guitar rhythm game apparatus 3 of a second music staging game apparatus enables the BGM music piece played to be output from both the drum rhythm game apparatus 2 and the guitar rhythm game apparatus 3 in a generally synchronized manner, thus realizing a powerful output of the BGM music piece to be played.

(3) Though the present embodiment involved using the differing types of staging operating units of the drum rhythm game apparatus 2 and the guitar rhythm game apparatus 3 to realize a widely varied staging with regard to the music piece to be played, the present invention is not restricted to such; rather, three or more rhythm-matching game apparatuses may be provided. In this case as well, one of the multiple rhythm-matching games plays the BGM music, and the sector Nos. of the disk storing the BGM music is used as synchronizing information.

(4) Though the present embodiment involved using the differing types of staging operating units of the drum rhythm game apparatus 2 and the guitar rhythm game apparatus 3 to realize a widely varied staging with regard to the music piece to be played, the present invention is not restricted to such; rather, the same type of staging operating units may be used, such as two drum rhythm game apparatuses 2, so the players can compete under the same conditions.

(5) Though the present embodiment has been configured such that the guitar rhythm game apparatus 3 has operating means of a form mimicking that of a guitar, with the auxiliary operating member being configured of a plurality of neck buttons corresponding to the series of rhythm sound types, and the timing instructing operating member being configured of one picking input means, and such that the drum rhythm game apparatus 2 is configured of a plurality of first mimic percussion instruments mimicking a drum to beat with a stick, and at least one second mimic percussion instrument for input by the foot; however, the present invention is not restricted to this. Various staging operating units (mimic instruments) can be conceived other than the drum rhythm game apparatus 2 and the guitar rhythm game apparatus 3, such as a piano rhythm game apparatus, keyboard rhythm game apparatus, and so forth.

(6) Though the present embodiment is arranged such that the drum rhythm game apparatus 2 involves the timing as to the sound data instructed as input detection timing and the input timing display instructions in the notes display 93 being compared, and the rhythm input being evaluated based on that offset amount, the evaluation means may evaluate based on the total offset amount obtained by accumulating the offset amount for each piece of sound data, or an arrangement may be made wherein the evaluating means sets a tolerance range before and after the operation timing of each piece of sound data, and accumulates subtraction values set according to the smallness of the amount of being off within the inner side of the boundary of the tolerance range as a reference thereof, and addition values set according to the greatness of the amount of being off at the outer side thereof, with the border between the outside and the inside thereof as a reference.

(7) Though the present embodiment is arranged such that the drum rhythm game apparatus 2 involves the notes bars 94 of rhythm sounds sequentially moving downwards along with elapsing of time toward the reference line 95 in the notes display 93, with the point of matching the reference line 95 being the timing for striking or pedal operating, with the notes bars 94 moving here, the invention is not restricted to this; rather, the reference line 95 may move, or the reference line 95 and the notes bars 94 may move, with the overlapping point being the input instructing timing.

(8) With the present embodiment, the drum rhythm game apparatus 2 may arranged such that one or multiple music pieces can be selected from five pieces for four stages of play levels, highest level (expert-real), advanced (real), medium (normal), and beginner (practice), or an arrangement may be made wherein multiple pieces (e.g., three) other than the five are hidden, and at the point that the selection of pieces remaining is close to being depleted, the hidden three pieces then appear on the monitor 42, so as to be selectable. This reduces the unfairness for players at the point that the selection of pieces remaining is close to being depleted, and the rhythm-matching game can be enjoyed more.

(9) With the present embodiment, a description has been made for the drum rhythm game apparatus 2 wherein drums, bass drums, and further cymbals are used as input means mimicking percussion instruments, but the present invention is not restricted to this, and can be applied to other percussion instruments such as xylophones, glockenspiels, kettledrums, other percussion instruments, and so forth.

(10) Though the present embodiment is arranged such that the drum rhythm game apparatus 2 involves the sound output control means being configured so as to output the sound data instructed as the input timing to the sound emitting means and be emitted, the invention is not restricted to this; rather, the sound emitting means may be controlled so as to conduct sound output only of BGM, without outputting sound data instructed as input timing to the sound emitting means, with evaluation of the input being displayed and output in the same manner as with the above embodiment.

(11) Though the present embodiment is arranged such that the drum rhythm game apparatus 2 involves the foot pedal 52 having been provided as the rhythm input detecting means for the bass drum to be operated with the right foot, an arrangement may be made wherein, in addition to or independently instead of this, a high-hat pedal (for emitting short or long cymbal sounds) for operation with the left foot is provided.

(12) With the present embodiment, the sound emitting output of the guitar rhythm game apparatus 3 needs only to contain rhythm sound, out of the following: rhythm sound, scales, and chord sounds (chords).

(13) Though the present embodiment is arranged such that the guitar rhythm game apparatus 3 involves the rhythm input operating means 107 having been configured such that the picking lever 172 turns, but the present invention is not restricted to this; rather, an arrangement may be made wherein this slides; in effect, the picking lever 172 should be configured vibratably.

(14) The present embodiment is arranged such that the guitar rhythm game apparatus 3 involves the operating timing of the timing instruction operating member as to the sound data instructed as operating timing and the operating timing display instruction being compared and the rhythm input operation being evaluated based on the amount of offset thereof, wherein the evaluation means may be evaluated from the total amount of offset obtained by accumulating the offset amount to each piece of sound data, or the evaluating means may set a tolerance range before and after the operating timing for each sound data, and accumulate subtraction values set according to the smallness of the amount of being off within the inner side of the boundary of the tolerance range as a reference thereof, and addition values set according to the greatness of the amount of being off at the outer side thereof.

(15) Though the present embodiment is arranged such that the guitar rhythm game apparatus 3 involves the notes bars 134 of rhythm sounds sequentially moving upwards along with elapsing of time in the notes display 131, toward the reference line 132, with the point of matching the reference line 132 being the operating timing, with the notes bars 134 moving here, but the invention is not restricted to this; rather, the reference line 132 may move, or the reference line 132 and the notes bars 134 may move, with the overlapping point being the operating instructing timing.

(16) With the present embodiment, the guitar rhythm game apparatus 3 involves one or multiple pieces being be selected from five pieces for three stages of play levels, advanced (expert), medium (normal), and beginner (practice), but an arrangement may be made wherein multiple pieces (e.g., two) other than the five are hidden, and at the point that the selection of pieces remaining is close to being depleted, the hidden two pieces then appear on the monitor 2, so as to be selectable. This reduces the unfairness for individuals selecting pieces at the point that the selection of pieces remaining is close to being depleted, and the rhythm-matching game can be enjoyed more.

(17) Though the present embodiment has been described such that the guitar rhythm game apparatus 3 uses mimic guitars 105 as the operating means, the invention is not restricted to this; and rather can be applied to instruments such as cellos, violins, ukuleles, shamisens, kotos, etc. In the case of cellos or violins, a bow-like member would be used instead of the picking.

(18) Though the present embodiment is arranged such that the guitar rhythm game apparatus 3 involves three neck buttons being provided, this number may be one, or any other number, and in the case of a plurality thereof, this would mimic a guitar. Also, the operation input to the neck button may be performed to one neck button, or simultaneously to multiple neck buttons.

(19) Though the present embodiment is arranged such that the guitar rhythm game apparatus 3 involves one rhythm input operating means 107 having a picking lever 172 provided, but the invention is not restricted to this; rather, a plurality thereof may be provided. In this case, the more picking levers 172 there are provided, the more realistic the playing becomes, and in the event that six or twelve are provided for example corresponding to the strings on a guitar, guitar accompaniment and arpeggio, or even playing of melody and chords separately can be performed, thus coming closer to guitar playing and allowing the game to be enjoyed more.

(20) Though the present embodiment is arranged such that the guitar rhythm game apparatus 3 involves the sound output control means being configured so as to output the sound data instructed as the operating timing to the sound emitting means and be emitted, the invention is not restricted to this; rather, the sound emitting means may be controlled so as to conduct sound output only of BGM, without outputting sound data instructed as operating timing to the sound emitting means, with evaluation of the operation being displayed and output in the same manner as with the above embodiment.

Figure 41:
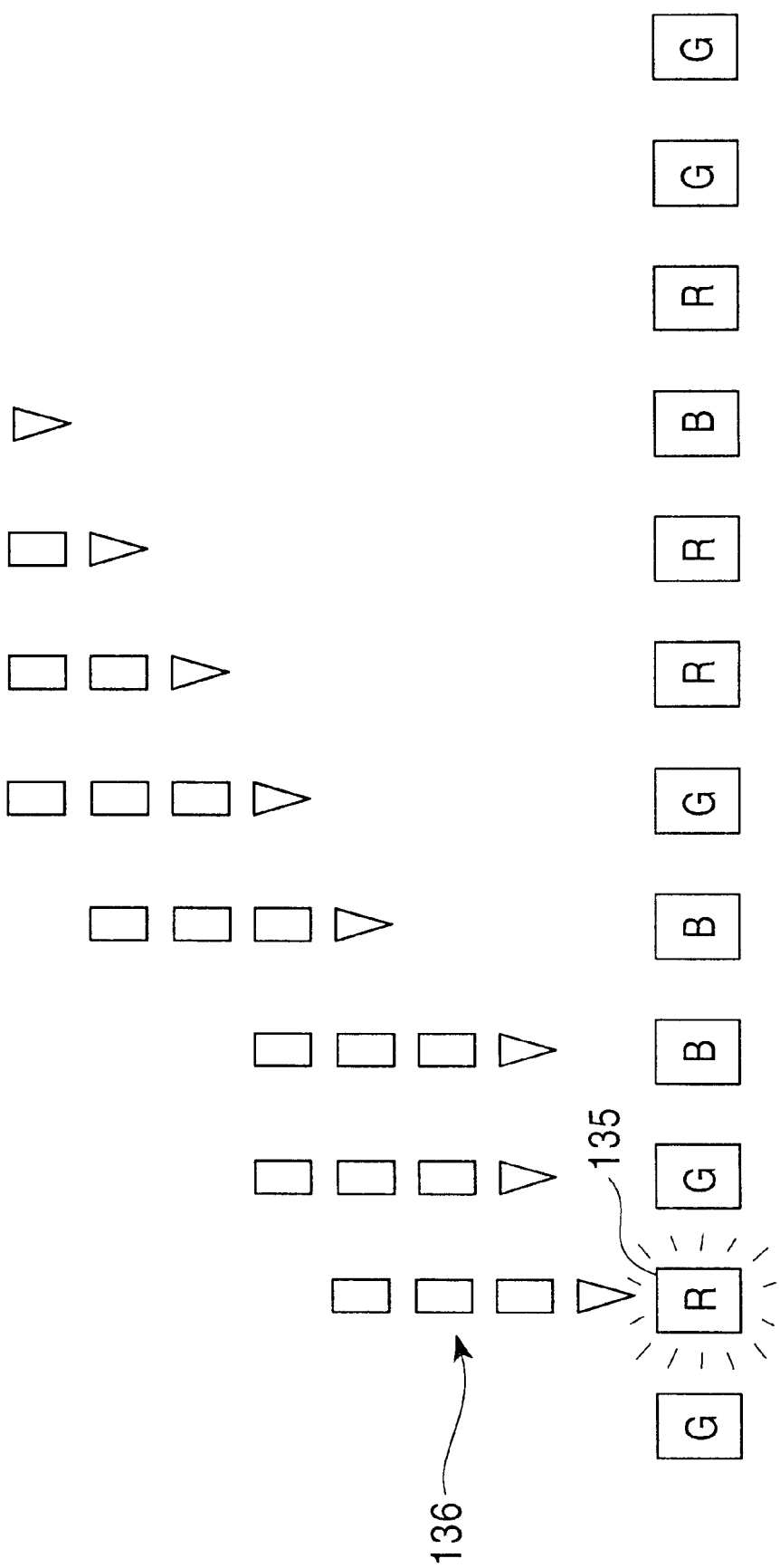
FIG. 41 is a diagram illustrating another embodiment of the notes display unit in the guitar rhythm game apparatus shown in FIG. 1.

(21) With the present embodiment, though the guitar rhythm game apparatus 3 is configured with the notes display 131 shown in FIG. 29, as shown in FIG. 41 the display for instructing the sound emitting timing with the display control means has the identification marks 135 being sequentially displayed by scrolling from one side of the display screen of the display means (monitor 102) to the other side, and timing marks 136 are moved on the display and controlled so as to head toward the corresponding identification marks 135 from the position generally corresponding to the identification marks 135, in a direction orthogonal with the above scrolling direction, so that at the point that the display position between the identification mark 135 displayed at the other-most side and the timing mark 136 corresponding to this identification mark 135 reach a certain relation, preferably the point of matching, this is instructed as the sound emitting timing.

(22) Though the present embodiment involves a transfer cable 4 being used as the transfer means for transferring sector Nos. between the drum rhythm game apparatus 2 and the guitar rhythm game apparatus 3, an audio cable may be separately provided for transferring the BGM as audio signals in the event that an arrangement is to be employed wherein the BGM music piece to be played is transferred, and in this case, the drum rhythm game apparatus 2 and the guitar rhythm game apparatus 3 are connected by the transfer cable 4 and an audio cable.

As described above, according to a first aspect of the present invention, a music game system comprises: a sound output unit for outputting the played sound of a music piece, based on playing information; a display unit for providing players with staging instructions, based on playing progression information synchronized with the playing information; a staging operating unit for players to perform operation regarding the staging instructions; and first and second music staging game apparatuses each having output units for outputting the contents of operation made to the staging operating unit; wherein the first and second music staging game apparatuses are connected by a communication unit for transferring at least the playing progression information; and wherein, regarding the communication unit, an information sending unit is provided to the side of the first music staging game apparatus, and an information receiving unit is provided to the side of the second music staging game apparatus. These staging operating units may be of different types or of the same type. Also, the second music staging game apparatus may be a plurality of music staging game apparatuses.

As for the method thereof, according to a second aspect of the present invention, a staging instructions synchronizing control method for a music game system having first and second music staging game apparatuses for outputting the played sound of a music piece based on playing information, providing players with staging display instructions based on playing progression information synchronized with the playing information, and outputting the operation contents of staging operation performed by players with the staging operating units regarding the staging display instructions; is arranged such that the first and second music staging game apparatuses are synchronized by transferring at least the playing progression information between the first and second music staging game apparatuses, thereby performing staging regarding the music.

Also, according to a third aspect of the present invention, a readable recording medium stores a staging instructions synchronizing control program for a music game system having first and second music staging game apparatuses for outputting the played sound of a music piece based on playing information, providing players with staging display instructions based on playing progression information synchronized with the playing information, and outputting the operation contents of staging operation performed by players with the staging operating units regarding the staging display instructions; wherein the first and second music staging game apparatuses are synchronized by transferring at least the playing progression information between the first and second music staging game apparatuses, thereby performing staging regarding the music.

With regard to the above-described aspects of the present invention, the first music staging game apparatus may preferably comprise: first-side music piece storing means for storing playing information for at least one music piece; first-side staging instructions information storing means for readably storing staging instructions information in a manner corresponding to the playing progression information; and first-side playing progression information reading means for reading playing progression information in a manner synchronous with the playing information read from the first-side music piece storing means; wherein the communication unit transfers the read playing progression information to the second music staging game apparatus.

The first-side playing progression information may be stored in the first-side music piece storing means in a manner synchronized with the playing information.

According to such a configuration as described here, playing progression information is transferred between the first and second music staging game apparatuses, thereby enabling staging operation to be made from each of the staging operating units while synchronizing the visual staging instructions to the players for the BGM music piece to be played, at both the first and second music staging game apparatuses, thereby allowing the game to be played in a state closer to reality where multiple players each have the stating operating units as different instrument parts, such as with an actual band, making the game even more enjoyable.

Also, the second music staging game apparatus may preferably comprise: second-side staging instructions information storing means for readably storing staging instructions information in a manner corresponding to the playing progression information; and second-side staging instructions information reading means for reading staging instructions information in a from the second-side staging instructions information storing means based on the playing progression information received with the communication unit.

Also, an arrangement may be made in conjunction with other arrangements wherein the first music staging game apparatus is provided with first music piece storing means but the second music staging game apparatus is not, wherein the played music piece serving as playing information (BGM) is output only from the first music staging game apparatus side, so there is no minute lagging in the played music piece which occurs in the event that output is made from both the first and second music staging game apparatuses.

The communication unit further may transmit playing information to the second music staging game apparatus, and the playing information (BGM) may be transferred from the first music staging game apparatus side to the second music staging game apparatus, so the minute lagging in the played music piece which occurs in the event that output is made from both the first and second music staging game apparatuses does not occur easily.

The second music staging game apparatus may comprise: second-side music piece storing means for storing the same playing information as the playing information stored in the first-side music piece storing means, in at least a portion thereof; and second-side music piece reading means for reading the playing information from the second-side music piece storing means, based on the playing progression information received with the communication unit, wherein the playing information (BGM) may be preferably read out of the music piece storing means of the second music staging game apparatus based on the playing progression information received by the second music staging game apparatus, so the playing information (BGM) is output from both the first and second music staging game apparatuses in a generally synchronized manner, thus realizing a powerful output of the BGM.

Also, the first and second music staging game apparatuses may each comprise master-slave control means and detecting means for detecting intent of starting a game, wherein the master-slave control means drivably controls the information sending unit as to the communicating unit, in the event that the apparatus to which the master-slave control means belongs has first detected intent of starting a game and has become the master apparatus.

Here, the master-slave relation of the first and second music staging game apparatuses may be determined by detecting the intent to start a game (e.g., to which of these a coin was deposited first, etc.), and information be transmitted from the master game apparatus to the slave game apparatus, so synchronizing can be easily realized by using the playing progression (sector No.) of one or other of the first and second music staging game apparatuses as reference for the other.

The first-side and second-side staging instructions information storing means are preferably arranged such that the staging instructions information is written into sequential writing areas in predetermined increments of time, and the playing progression information corresponds to instructing information for instructing the writing area. Also, the first-side and second-side staging instructions information storing means may comprise disk recording media, wherein the instructions information in the writing area is sector Nos. set on the disk recording media.

The method according to the present invention may preferably comprise the steps of: a step for sending a start command from one of the first and second music staging game apparatuses to the other music staging game apparatus by a start operation, and receiving the start command from the other music staging game apparatus; a step for obtaining a sector No. for synchronizing information from a disk, following the one music staging game apparatus having received the start command; a step for transmitting the obtained sector No. from the one music staging game apparatus to the other music staging game apparatus; and a step for performing staging regarding music, based on either the obtained sector No. or the received sector No.

Also, preferably recorded is a staging instructions synchronizing control program for a music game system, comprising the steps of: a step for sending a start command from one of the first and second music staging game apparatuses to the other music staging game apparatus by a start operation, and receiving the start command from the other music staging game apparatus; a step for obtaining a sector No. for synchronizing information from a disk, following the one music staging game apparatus having received the start command; a step for transmitting the obtained sector No. from the one music staging game apparatus to the other music staging game apparatus; and a step for performing staging regarding music, based on either the obtained sector No. or the received sector No.

Now, the sector Nos. of the writing position information of the playing information (BGM) can be used to easily and accurately synchronize the visual staging instructions to the players regarding the playing information (BGM) between the first and second music staging game apparatuses. The first reading means may preferably correct the read staging progression information into playing progression information preceding by a predetermined amount of time, and take this to the communication unit, and, the second-side playing progression information reading means may preferably read the staging instructions information preceding the playing progression information from the communication unit by a predetermined amount of time from the second-side staging instructions information storing means. Thus, the lagging of the playing progression information owing to communication can be resolved, and suitable synchronization can be realized between the first and second music staging game apparatuses.

Also, each of the staging operating units of the first and second music staging game apparatuses may be staging operating units of different types, with the first staging instructions storing means storing a first type of rhythm notes corresponding to the music piece being played and the staging operating unit being configured so as to be capable of operation corresponding to the operation instruction timing of rhythm sounds displayed on the display unit, and the second staging instructions storing means storing a second type of rhythm sounds corresponding to the music piece being played and the staging operating unit being configured so as to be capable of operation corresponding to the operation instruction timing of rhythm sounds displayed on the display unit. Thus, differing types of staging operating units such as drum rhythm game apparatuses and guitar rhythm game apparatuses can be used to realize a widely varied staging with regard to the music piece to be played.

The concept of interactivity can also be considered to have been incorporated in the above.

Thus, playing progression information can be transferred between the first and second music staging game apparatuses, thereby enabling staging operation to be made from each of the staging operating units while synchronizing the visual staging instructions to the players for the BGM music piece to be played, at both the first and second music staging game apparatuses, thus allowing the game to be played in a state closer to reality where multiple players each have staging operating units as different instrument parts, such as with an actual band, making the game even more enjoyable.

Also, with a configuration wherein the playing information (BGM) is output only from the first music staging game apparatus side, there is no minute lagging in the played music piece which occurs in the event that output is made from both the first and second music staging game apparatuses.

Also, even in the event that output of playing information (BGM) is made from both the first and second music staging game apparatuses, the playing information (BGM) can be transferred from the first music staging game apparatus side to the second music staging game apparatus along with playing progression information, so the minute lagging in the played music piece which occurs in the event that output is made from both the first and second music staging game apparatuses can be suppressed.

Also, with a configuration wherein the playing information (BGM) is read out of the music piece storing means of the second music staging game apparatus based on the playing progression information received by the second music staging game apparatus, the playing information (BGM) is output from both the first and second music staging game apparatuses in a generally synchronized manner, thus realizing a powerful output of the playing information (BGM).

Also, with a configuration wherein the master-slave relation of the first and second music staging game apparatuses is determined by detection of intent to start a game (e.g., to which of these a coin was deposited first, etc.), and information is transmitted from the master game apparatus to the slave game apparatus, synchronizing can be easily realized by using the playing progression of one or other of the first and second music staging game apparatuses as reference for the other.

Also, the sector Nos. of the writing position information of the playing information (BGM) can be used to easily and accurately synchronize the visual staging instructions to the players regarding the playing information (BGM) between the first and second music staging game apparatuses. The lagging of the playing progression information owing to communication can be resolved, and suitable synchronization can be realized between the first and second music staging game apparatuses, and differing types of staging operating units such as drum rhythm game apparatuses and guitar rhythm game apparatuses can be used, and widely varied staging with regard to the music piece to be played can be realized.

What is claimed is:

1. A music game system, comprising:
    a sound output unit for outputting the played sound of a music piece, based on playing information;
    a display unit for providing players with staging instructions, based on playing progression information synchronized with said playing information;
    a staging operating unit for players to perform operation regarding said staging instructions; and
    first and second music staging game apparatuses each having output units for outputting the contents of operation made to said staging operating unit;
    wherein said first and second music staging game apparatuses are connected by a communication unit for transferring at least said playing progression information;
    and wherein, regarding said communication unit, an information sending unit is provided to the side of said first music staging game apparatus, and an information receiving unit is provided to the side of said second music staging game apparatus.

2. A music game system according to claim 1, wherein said first music staging game apparatus comprises:
    first-side music piece storing means for storing playing information for at least one music piece;
    first-side staging instructions information storing means for readably storing staging instructions information in a manner corresponding to said playing progression information; and
    first-side playing progression information reading means for reading playing progression information in a manner synchronous with the playing information read from said first-side music piece storing means;
    wherein said communication unit transfers said read playing progression information to said second music staging game apparatus.

3. A music game system according to claim 2, wherein said first-side playing progression information is stored in said first-side music piece storing means in a manner synchronized with said playing information.

4. A music game system according to claim 2, wherein said second music staging game apparatus comprises:
    second-side staging instructions information storing means for readably storing staging instructions information in a manner corresponding to said playing progression information; and
    second-side staging instructions information reading means for reading staging instructions information in a from said second-side staging instructions information storing means based on the playing progression information received with said communication unit.

5. A music game system according to claim 3, wherein said second music staging game apparatus comprises:
    second-side staging instructions information storing means for readably storing staging instructions information in a manner corresponding to said playing progression information; and
    second-side staging instructions information reading means for reading staging instructions information in a from said second-side staging instructions information storing means based on the playing progression information received with said communication unit.

6. A music game system according to claim 4, wherein said communication unit further transmits playing information to said second music staging game apparatus.

7. A music game system according to claim 5, wherein said communication unit further transmits playing information to said second music staging game apparatus.

8. A music game system according to claim 4, wherein said second music staging game apparatus comprises:
    second-side music piece storing means for storing the same playing information as the playing information stored in said first-side music piece storing means, in at least a portion thereof; and second-side music piece reading means for reading the playing information from said second-side music piece storing means, based on the playing progression information received with said communication unit.

9. A music game system according to claim 5, wherein said second music staging game apparatus comprises:

second-side music piece storing means for storing the same playing information as the playing information stored in said first-side music piece storing means, in at least a portion thereof; and second-side music piece reading means for reading the playing information from said second-side music piece storing means, based on the playing progression information received with said communication unit.

10. A music game system according to claim 8, wherein said first and second music staging game apparatuses each comprise master-slave control means and detecting means for detecting intent of starting a game, wherein said master-slave control means controls said information sending unit as to said communicating unit, in the event that the apparatus to which said master-slave control means belongs has first detected intent of starting a game and has become a master apparatus.

11. A music game system according to claim 2, wherein:

the first-side and second-side staging instruction s information storing means are arranged such that said playing instructions information is written into sequential writing areas in predetermined increments of time; and said playing progression information corresponds to instructing information for instructing said writing areas.

12. A music game system according to claim 11, wherein said first-side and second-side playing progression information storing means comprise disk recording media, and the instructions information in said writing area is sector numbers set on the disk recording media.

13. A music game system according to claim 2, wherein said first-side playing progression information reading means corrects said read playing progression information into corrected playing progression information preceding by a predetermined amount of time, and transfers said corrected playing progression information to said communication unit.

14. A music game system according to claim 1, wherein said second-side playing progression information reading means reads said playing instructions information preceding said playing progression information from said communication unit by a predetermined amount of time from said second-side staging instructions information storing means.

15. A music game system according to claim 1, wherein each of the staging operating units of said first and second music staging game apparatuses are staging operating units of different types.

16. A music game system according to claim 1, wherein:

said first staging instructions storing means stores a first type of rhythm sounds corresponding to the music piece being played, and said staging operating unit is configured so as to be capable of operation corresponding to the operation instruction timing of rhythm sounds displayed on said display unit; and said second staging instructions storing means stores a second type of rhythm sounds corresponding to the music piece being played, and said staging operating unit is configured so as to be capable of operation corresponding to the operation instruction timing of rhythm sounds displayed on said display unit.

17. A staging instructions synchronizing control method for a music game system having first and second music staging game apparatuses for outputting the played sound of a music piece based on playing information, providing players with staging display instructions based on playing progression information synchronized with said playing information, and outputting the operation contents of staging operation performed by players with the staging operating units regarding said staging display instructions;

wherein said first and second music staging game apparatuses are synchronized by transferring at least said playing progression information between said first and second music staging game apparatuses, thereby performing staging regarding the music.

18. A staging instructions synchronizing control method for a music game system according to claim 17, said method comprising the steps of:

sending a start command from one of said first and second music staging game apparatuses to the other music staging game apparatus by a start operation, and receiving the start command from the other music staging game apparatus;

obtaining a sector number for synchronizing information from a disk, following said one music staging game apparatus having received said start command;

correcting said sector number by preceding the sector number by an amount corresponding to a predetermined time to obtain a corrected sector number;

transmitting said corrected sector number from said one music staging game apparatus to said other music staging game apparatus; and performing staging regarding music, based on at least one of said obtained sector number and said corrected sector number.

19. A readable recording medium storing a staging instructions synchronizing control program for a music game system having first and second music staging game apparatuses for outputting the played sound of a music piece based on playing information, providing players with staging display instructions based on playing progression information synchronized with said playing information, and outputting the operation contents of staging operation performed by players with the staging operating units regarding said staging display instructions;

wherein said first and second music staging game apparatuses are synchronized by transferring at least said playing progression information between said first and second music staging game apparatuses, thereby performing staging regarding the music.

20. A readable recording medium according to claim 19 storing a staging instructions synchronizing control program for a music game system, said program comprising the steps of:

sending a start command from one of said first and second music staging game apparatuses to the other music staging game apparatus by a start operation, and receiving the start command from the other music staging game apparatus;

obtaining a sector number for synchronizing information from a disk, following said one music staging game apparatus having received said start command;

correcting said sector number by preceding the sector number by an amount corresponding to a predetermined time to obtain a corrected sector number;

transmitting said corrected sector number from said one music staging game apparatus to said other music staging game apparatus; and performing staging regarding music, based on at least one of said obtained sector number and said corrected sector number.

21. A music game system, comprising:

first and second music staging game apparatuses each including:
- a sound output unit for outputting the played sound of a music piece, based on playing information;
- a display unit for providing players with staging instructions, based on playing progression information synchronized with said playing information;
- a staging operating unit for players to perform operation regarding said staging instructions;
- an output unit for outputting the contents of operation made to said staging operating unit;
- a communication unit for connecting said first and second music staging game apparatuses for transfer of at least said playing progression information, said communication unit including an information sending unit provided to a side of said first music staging game apparatus and an information receiving unit provided to a side of said second music staging game apparatus; and
- master-slave control means for controlling said communication unit of said first music staging game apparatus such that said master-slave control means transfers the playing progression information, which is ahead by a predetermined time corresponding to a time delay owing to transmission and reception by the communication unit, to said second music staging game apparatus.

22. A music game system, comprising:

first and second music staging game apparatuses each including:
- a sound output unit for outputting the played sound of a music piece, based on playing information;
- a display unit for providing players with staging instructions, based on playing progression information synchronized with said playing information;
- a staging operating unit for players to perform operation regarding said staging instructions; and
- an output unit for outputting the contents of operation made to said staging operating unit;
- a communication unit for connecting said first and second music staging game apparatuses for transfer of at least said playing progression information, said communication unit including an information sending unit provided to a side of said first music staging game apparatus and an information receiving unit provided to a side of said second music staging game apparatus;

said first music staging apparatus including:
- first-side music piece storing means for storing playing information for at least one music piece;
- first-side staging instructions information storing means for readably storing staging instructions information in a manner corresponding to said playing progression information; and
- first-side playing progression information reading means for reading playing progression information in a manner synchronous with the playing information read from said first-side music piece storing means for correcting said read playing progression information into corrected playing progression information preceding by a predetermined amount of time and transferring the corrected playing progression information to said communication unit; and said second music staging apparatus including:
- second-side staging instructions information storing means for readably storing staging instructions information in a manner corresponding to said playing progression information; and
- second-side staging instructions information reading means for reading staging instructions information in a from said second-side staging instructions information storing means based on said corrected playing progression information from said first music staging apparatus received through said communication unit.

23. A method of controlling synchronization of staging instructions for a music game system having first and second music staging game apparatuses for outputting the played sound of a music piece based on playing information, comprising the steps of:

providing players with staging display instructions based on playing progression information synchronized with said playing information;

outputting the operation contents of staging operation performed by players with the staging operating units regarding said staging display instructions; and synchronizing said first and second music staging game apparatuses by transferring at least said playing progression information between said first and second music staging game apparatuses, thereby performing staging regarding the music.

24. A readable recording medium storing a staging instructions synchronizing control program for a music game system having first and second music staging game apparatuses for outputting the played sound of a music piece based on playing information, the program including executable code allowing a computer to perform the steps comprising:

providing players with staging display instructions based on playing progression information synchronized with said playing information;

outputting the operation contents of staging operation performed by players with the staging operating units regarding said staging display instructions; and synchronizing said first and second music staging game apparatuses by transferring at least said playing progression information between said first and second music staging game apparatuses, thereby performing staging regarding the music.

* * * * *